US012513062B2

(12) United States Patent
Ramachandra et al.

(10) Patent No.: US 12,513,062 B2
(45) Date of Patent: Dec. 30, 2025

(54) METHODS AND APPARATUSES FOR REPORTING OF MULTIPLE RADIO LINK FAILURES

(71) Applicant: Telefonaktiebolaget LM Ericsson (publ), Stockholm (SE)

(72) Inventors: Pradeepa Ramachandra, Linköping (SE); Angelo Centonza, Granada (ES); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 18/029,463

(22) PCT Filed: Sep. 23, 2021

(86) PCT No.: PCT/SE2021/050925
§ 371 (c)(1),
(2) Date: Mar. 30, 2023

(87) PCT Pub. No.: WO2022/086384
PCT Pub. Date: Apr. 28, 2022

(65) Prior Publication Data
US 2023/0388204 A1  Nov. 30, 2023

Related U.S. Application Data

(60) Provisional application No. 63/094,098, filed on Oct. 20, 2020.

(51) Int. Cl.
*H04L 43/04* (2022.01)
*H04L 43/0805* (2022.01)
(Continued)

(52) U.S. Cl.
CPC .......... *H04L 43/04* (2013.01); *H04L 43/0805* (2013.01); *H04W 24/10* (2013.01); *H04W 76/19* (2018.02); *H04W 36/305* (2018.08)

(58) Field of Classification Search
CPC .. H04L 43/04; H04L 43/0805; H04W 36/305; H04W 24/10; H04W 76/19
See application file for complete search history.

(56) References Cited

U.S. PATENT DOCUMENTS

| 2011/0250880 A1* | 10/2011 | Olsson | H04W 76/18 |
| | | | 455/423 |
| 2015/0208295 A1* | 7/2015 | Da Silva | H04W 76/18 |
| | | | 370/221 |

(Continued)

FOREIGN PATENT DOCUMENTS

| WO | 2019245352 A1 | 12/2019 |
| WO | 2020156497 A1 | 8/2020 |

OTHER PUBLICATIONS

"3GPP TS 38.321 V16.2.0", 3rd Generation Partnership Project; Technical Specification Group Radio Access Network; NR; Medium Access Control (MAC) protocol specification (Release 16), Sep. 2020, pp. 1-107.

(Continued)

*Primary Examiner* — Brian J. Gillis
*Assistant Examiner* — Chhian (Amy) Ling
(74) *Attorney, Agent, or Firm* — Murphy, Bilak & Homiller, PLLC

(57) ABSTRACT

Methods and apparatuses for a user equipment, UE, to report radio link failure, RLF, in a wireless network, said methods include sending, to a radio network node, RNN, in the wireless network, a first message including: a first RLF report related to an RLF that occurred in a cell of the wireless network, and a second indication of availability of one or more further RLF reports stored by the UE. The methods further include receiving, from the RNN, a second request for at least a portion of the stored RLF reports indicated by the second indication and sending, to the RNN, (Continued)

Upon establishing a connection with a RNN, sending to the RNN a first indication of availability of a plurality of stored RLF reports. — 1710

Receiving, from the RNN, a first request for at least a portion of the stored RLF reports indicated by the first indication. — 1720

Sending, to the RNN, a first message including: a first RLF report related to an RLF the occurred in a cell of the wireless network, and a second indication of availability of one or more further RLF reports stored by the UE. — 1730

Receiving, from the RNN, a second request for at least a portion of the stored RLF reports indicated by the second indication. — 1740

Sending, to the RNN, a second response including a second RLF report of the stored RLF reports. — 1750 a second response including a second RLF report of the stored RLF reports. The apparatuses are configured to perform such methods.

19 Claims, 17 Drawing Sheets

(51) Int. Cl.
    *H04W 24/10*     (2009.01)
    *H04W 36/30*     (2009.01)
    *H04W 76/19*     (2018.01)

(56) References Cited

U.S. PATENT DOCUMENTS

| | | | |
|---|---|---|---|
| 2017/0086109 A1* | 3/2017 | Da Silva | H04W 76/18 |
| 2020/0153542 A1* | 5/2020 | Zhou | H04B 7/0617 |
| 2021/0266811 A1* | 8/2021 | Hwang | H04W 28/06 |

OTHER PUBLICATIONS

"3GPP TS 23.501 V16.5.0", 3rd Generation Partnership Project; Technical Specification Group Services and System Aspects; System architecture for the 5G System (5GS); Stage 2 (Release 16), Jul. 2020, pp. 1-441.

"3GPP TS 38.133 V16.4.0", 3rd Generation Partnership Project; Technical Specification Group Radio Access Network; NR; Requirements for support of radio resource management (Release 16), Jun. 2020, pp. 1-1463.

"3GPP TS 38.300 V16.3.0", 3rd Generation Partnership Project; Technical Specification Group Radio Access Network; NR; NR and NG-RAN Overall Description; Stage 2 (Release 16), Sep. 2020, pp. 1-148.

"3GPP TS 38.304 V16.2.0", 3rd Generation Partnership Project; Technical Specification Group Radio Access Network; NR; User Equipment (UE) procedures in Idle mode and RRC Inactive state (Release 16), Sep. 2020, pp. 1-39.

"3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Jul. 2020, pp. 1-390.

"3GPP TS 36.331 V16.2.1", 3rd Generation Partnership Project; Technical Specification Group Radio Access Network; Evolved Universal Terrestrial Radio Access (E-UTRA); Radio Resource Control (RRC); Protocol specification (Release 16), Sep. 2020, pp. 1-1081.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.

* cited by examiner

```
-- ASN1START
-- TAG-RLF-TIMERSANDCONSTANTS-START
RLF-TimersAndConstants ::= SEQUENCE {
    t310                        ENUMERATED {ms0, ms50, ms100, ms200, ms500,
                                            ms1000, ms2000, ms4000, ms6000},
    n310                        ENUMERATED {n1, n2, n3, n4, n6, n8, n10, n20},
    n311                        ENUMERATED {n1, n2, n3, n4, n5, n6, n8, n10},
    ...,
    [[
    t311                        ENUMERATED {ms1000, ms3000, ms5000, ms10000,
                                            ms15000, ms20000, ms30000}                 ]],
    [[
    t316-r16                    SetupRelease {T316-r16 } OPTIONAL  -- Cond MCG-Only ]]
}
T316-r16 ::= ENUMERATED {ms50, ms100, ms200, ms300, ms400, ms500, m600, ms1000,
                         ms1500, ms2000}
-- TAG-RLF-TIMERSANDCONSTANTS-STOP
-- ASN1STOP
```

FIG. 10

```
-- ASN1START
-- TAG-RRCREESTABLISHMENTCOMPLETE-START
RRCReestablishmentComplete ::=      SEQUENCE {
    rrc-TransactionIdentifier           RRC-TransactionIdentifier,
    criticalExtensions                  CHOICE {
        rrcReestablishmentComplete          RRCReestablishmentComplete-IEs,
        criticalExtensionsFuture            SEQUENCE {}
    }
}
RRCReestablishmentComplete-IEs ::= SEQUENCE {
    lateNonCriticalExtension        OCTET STRING                            OPTIONAL,
    nonCriticalExtension            RRCReestablishmentComplete-v16xy-IEs OPTIONAL
}
RRCReestablishmentComplete-v16xy-IEs ::= SEQUENCE {
    logMeasAvailable-r16            ENUMERATED {true}           OPTIONAL,
    logMeasAvailableBT-r16          ENUMERATED {true}           OPTIONAL,
    logMeasAvailableWLAN-r16        ENUMERATED {true}           OPTIONAL,
    connEstFailInfoAvailable-r16    ENUMERATED {true}           OPTIONAL,
    rlf-InfoAvailable-r16           ENUMERATED {true}           OPTIONAL,
    nonCriticalExtension            SEQUENCE {}                 OPTIONAL
}
-- TAG-RRCREESTABLISHMENTCOMPLETE-STOP
-- ASN1STOP
```

FIG. 11

```
-- ASN1START
-- TAG-UEINFORMATIONREQUEST-START
UEInformationRequest-r16 ::=    SEQUENCE {
    rrc-TransactionIdentifier       RRC-TransactionIdentifier,
    criticalExtensions              CHOICE {
        ueInformationRequest-r16        UEInformationRequest-r16-IEs,
        criticalExtensionsFuture        SEQUENCE {}
    }
}
UEInformationRequest-r16-IEs ::= SEQUENCE {
    idleModeMeasurementReq-r16      ENUMERATED{ffs}         OPTIONAL, -- Need N
    logMeasReportReq-r16            ENUMERATED {true}       OPTIONAL,
    connEstFailReportReq-r16        ENUMERATED {true}       OPTIONAL,
    ra-ReportReq-r16                ENUMERATED {true}       OPTIONAL,
    rlf-ReportReq-r16               ENUMERATED {true}       OPTIONAL,
    mobilityHistoryReportReq-r16    ENUMERATED {true}       OPTIONAL,
    lateNonCriticalExtension        OCTET STRING            OPTIONAL,
    nonCriticalExtension            SEQUENCE {}             OPTIONAL
}
-- TAG-UEINFORMATIONREQUEST-STOP
-- ASN1STOP
```

FIG. 12

```
-- ASN1START
-- TAG-UEINFORMATIONRESPONSE-START
UEInformationResponse-r16 ::=          SEQUENCE {
    rrc-TransactionIdentifier              RRC-TransactionIdentifier,
    criticalExtensions                     CHOICE {
        ueInformationResponse-r16              UEInformationResponse-r16-IEs,
        criticalExtensionsFuture               SEQUENCE {}
    }
}
UEInformationResponse-r16-IEs ::=      SEQUENCE {
    measResultIdleEUTRA-r16                MeasResultIdleEUTRA-r16         OPTIONAL,
    measResultIdleNR-r16                   MeasResultIdleNR-r16            OPTIONAL,
    logMeasReport-r16                      LogMeasReport-r16               OPTIONAL,
    connEstFailReport-r16                  ConnEstFailReport-r16           OPTIONAL,
    ra-ReportList-r16                      RA-ReportList-r16               OPTIONAL,
    rlf-Report-r16                         RLF-Report-r16                  OPTIONAL,
    mobilityHistoryReport-r16              MobilityHistoryReport-r16       OPTIONAL,
    lateNonCriticalExtension               OCTET STRING                    OPTIONAL,
    nonCriticalExtension                   SEQUENCE {}                     OPTIONAL
}
...
RLF-Report-r16 ::=                     CHOICE {
    nr-RLF-Report-r16                      SEQUENCE {
        measResultLastServCell-r16             MeasResultRLFNR-r16,
        measResultNeighCells-r16               SEQUENCE {
            measResultListNR-r16                   MeasResultList2NR-r16       OPTIONAL,
            measResultListEUTRA-r1                 MeasResultList2EUTRA-r16    OPTIONAL
        }                                          OPTIONAL,
        c-RNTI-r16                             RNTI-Value,
        previousPCellId-r16                    CHOICE {
            nrPreviousCell-r16                     CGI-Info-Logging-r16,
            eutraPreviousCell-r16                  CGI-InfoEUTRALogging
        }                                                                      OPTIONAL,
        failedPCellId-r16                      CHOICE {
            nrFailedPCellId-r16                    CHOICE {
                cellGlobalId-r16                       CGI-Info-Logging-r16,
                pci-arfcn-r16                          SEQUENCE {
                    physCellId-r16                         PhysCellId,
                    carrierFreq-r16                        ARFCN-ValueNR
                }
            },
            eutraFailedPCellId-r16                 CHOICE {
                cellGlobalId-r16                       CGI-InfoEUTRALogging,
                pci-arfcn-r16                          SEQUENCE {
                    physCellId-r16                         EUTRA-PhysCellId,
                    carrierFreq-r16                        ARFCN-ValueEUTRA
                }
            }
        },
        reconnectCellId-r16                    CHOICE {
            nrReconnectCellId-r16                  CGI-Info-Logging-r16,
            eutraReconnectCellId-r16               CGI-InfoEUTRALogging
        }                                                                      OPTIONAL,
        timeUntilReconnection-16               TimeUntilReconnection-16        OPTIONAL,
        reestablishmentCellId-r16              CGI-Info-Logging-r16            OPTIONAL,
        timeConnFailure-r16                    INTEGER (0..1023)               OPTIONAL,
        timeSinceFailure-r16                   TimeSinceFailure-r16,
        connectionFailureType-r16              ENUMERATED {rlf, hof},
        rlf-Cause-r16                          ENUMERATED {t310-Expiry, randomAccessProblem,
                                                   rlc-MaxNumRetx, beamFailureRecoveryFailure,
                                                   lbtFailure-r16, bh-rlfRecoveryFailure,
                                                   spare2, spare1},
        locationInfo-r16                       LocationInfo-r16                OPTIONAL,
        noSuitableCellFound-r16                ENUMERATED {true}               OPTIONAL,
        ra-InformationCommon-r16               RA-InformationCommon-r16        OPTIONAL,
    },
    eutra-RLF-Report-r16                   SEQUENCE {
        failedPCellId-EUTRA                    CGI-InfoEUTRALogging,
        measResult-RLF-Report-EUTRA-r16        OCTET STRING
    }
}
...
-- TAG-UEINFORMATIONRESPONSE-STOP
-- ASN1STOP
```

FIG. 13

```
-- ASN1START
-- TAG-UEINFORMATIONRESPONSE-START
UEInformationResponse-r16 ::=           SEQUENCE {
    rrc-TransactionIdentifier               RRC-TransactionIdentifier,
    criticalExtensions                      CHOICE {
        ueInformationResponse-r16               UEInformationResponse-r16-IEs,
        criticalExtensionsFuture                SEQUENCE {}
    }
}
UEInformationResponse-r16-IEs ::=       SEQUENCE {
    measResultIdleEUTRA-r16                 MeasResultIdleEUTRA-r16         OPTIONAL,
    measResultIdleNR-r16                    MeasResultIdleNR-r16            OPTIONAL,
    logMeasReport-r16                       LogMeasReport-r16               OPTIONAL,
    connEstFailReport-r16                   ConnEstFailReport-r16           OPTIONAL,
    ra-ReportList-r16                       RA-ReportList-r16               OPTIONAL,
    rlf-Report-r16                          RLF-Report-r16                  OPTIONAL,
    mobilityHistoryReport-r16               MobilityHistoryReport-r16       OPTIONAL,
    lateNonCriticalExtension                OCTET STRING                    OPTIONAL,
    nonCriticalExtension                    UEInformationResponse-r17-IEs   OPTIONAL
}
UEInformationResponse-r17-IEs ::=       SEQUENCE {
    rlf-InfoAvailable-r17                   ENUMERATED {true}               OPTIONAL,
    lateNonCriticalExtension                OCTET STRING                    OPTIONAL,
    nonCriticalExtension                    SEQUENCE {}                     OPTIONAL
}
...
-- TAG-UEINFORMATIONRESPONSE-STOP
-- ASN1STOP
```

FIG. 14A

```
-- ASN1START
-- TAG-UEINFORMATIONRESPONSE-START
UEInformationResponse-r16 ::=           SEQUENCE {
    rrc-TransactionIdentifier               RRC-TransactionIdentifier,
    criticalExtensions                      CHOICE {
        ueInformationResponse-r16               UEInformationResponse-r16-IEs,
        criticalExtensionsFuture                SEQUENCE {}
    }
}
UEInformationResponse-r16-IEs ::=       SEQUENCE {
    measResultIdleEUTRA-r16                 MeasResultIdleEUTRA-r16         OPTIONAL,
    measResultIdleNR-r16                    MeasResultIdleNR-r16            OPTIONAL,
    logMeasReport-r16                       LogMeasReport-r16               OPTIONAL,
    connEstFailReport-r16                   ConnEstFailReport-r16           OPTIONAL,
    ra-ReportList-r16                       RA-ReportList-r16               OPTIONAL,
    rlf-Report-r16                          RLF-Report-r16                  OPTIONAL,
    mobilityHistoryReport-r16               MobilityHistoryReport-r16       OPTIONAL,
    lateNonCriticalExtension                OCTET STRING                    OPTIONAL,
    nonCriticalExtension                    UEInformationResponse-r17-IEs   OPTIONAL
}
UEInformationResponse-r17-IEs ::=       SEQUENCE {
    rlf-InfoAvailable-r17                   ENUMERATED {nr, eutra, both}    OPTIONAL,
    lateNonCriticalExtension                OCTET STRING                    OPTIONAL,
    nonCriticalExtension                    SEQUENCE {}                     OPTIONAL
}
...
-- TAG-UEINFORMATIONRESPONSE-STOP
-- ASN1STOP
```

FIG. 14B

```
-- ASN1START
-- TAG-UEINFORMATIONRESPONSE-START
UEInformationResponse-r16 ::=          SEQUENCE {
    rrc-TransactionIdentifier              RRC-TransactionIdentifier,
    criticalExtensions                     CHOICE {
        ueInformationResponse-r16              UEInformationResponse-r16-IEs,
        criticalExtensionsFuture               SEQUENCE {}
    }
}
UEInformationResponse-r16-IEs ::=      SEQUENCE {
    measResultIdleEUTRA-r16                MeasResultIdleEUTRA-r16            OPTIONAL,
    measResultIdleNR-r16                   MeasResultIdleNR-r16               OPTIONAL,
    logMeasReport-r16                      LogMeasReport-r16                  OPTIONAL,
    connEstFailReport-r16                  ConnEstFailReport-r16              OPTIONAL,
    ra-ReportList-r16                      RA-ReportList-r16                  OPTIONAL,
    rlf-Report-r16                         RLF-Report-r16                     OPTIONAL,
    mobilityHistoryReport-r16              MobilityHistoryReport-r16          OPTIONAL,
    lateNonCriticalExtension               OCTET STRING                       OPTIONAL,
    nonCriticalExtension                   SEQUENCE {}                        OPTIONAL
}
...
RLF-Report-r16 ::=                     CHOICE {
    nr-RLF-Report-r16                      SEQUENCE {
        measResultLastServCell-r16             MeasResultRLFNR-r16,
        measResultNeighCells-r16               SEQUENCE {
            measResultListNR-r16                   MeasResultList2NR-r16          OPTIONAL,
            measResultListEUTRA-r1                 MeasResultList2EUTRA-r16       OPTIONAL
        }                                      OPTIONAL,
        c-RNTI-r16                             RNTI-Value,
        previousPCellId-r16                    CHOICE {
            nrPreviousCell-r16                     CGI-Info-Logging-r16,
            eutraPreviousCell-r16                  CGI-InfoEUTRALogging
        }                                                                     OPTIONAL,
        failedPCellId-r16                      CHOICE {
            nrFailedPCellId-r16                    CHOICE {
                cellGlobalId-r16                       CGI-Info-Logging-r16,
                pci-arfcn-r16                          SEQUENCE {
                    physCellId-r16                         PhysCellId,
                    carrierFreq-r16                        ARFCN-ValueNR
                }
            },
            eutraFailedPCellId-r16                 CHOICE {
                cellGlobalId-r16                       CGI-InfoEUTRALogging,
                pci-arfcn-r16                          SEQUENCE {
                    physCellId-r16                         EUTRA-PhysCellId,
                    carrierFreq-r16                        ARFCN-ValueEUTRA
                }
            }
        },
        reconnectCellId-r16                    CHOICE {
            nrReconnectCellId-r16                  CGI-Info-Logging-r16,
            eutraReconnectCellId-r16               CGI-InfoEUTRALogging
        }                                                                     OPTIONAL,
        timeUntilReconnection-16               TimeUntilReconnection-16           OPTIONAL,
        reestablishmentCellId-r16              CGI-Info-Logging-r16               OPTIONAL,
        timeConnFailure-r16                    INTEGER (0..1023)                  OPTIONAL,
        timeSinceFailure-r16                   TimeSinceFailure-r16,
        connectionFailureType-r16              ENUMERATED {rlf, hof},
        rlf-Cause-r16                          ENUMERATED {t310-Expiry, randomAccessProblem,
                                                   rlc-MaxNumRetx, beamFailureRecoveryFailure,
                                                   lbtFailure-r16, bh-rlfRecoveryFailure,
                                                   spare2, spare1},
        locationInfo-r16                       LocationInfo-r16                   OPTIONAL,
        noSuitableCellFound-r16                ENUMERATED {true}                  OPTIONAL,
        ra-InformationCommon-r16               RA-InformationCommon-r16           OPTIONAL,
        rlf-InfoAvailable-r17                  ENUMERATED {true}                  OPTIONAL,
    },
    eutra-RLF-Report-r16                   SEQUENCE {
        failedPCellId-EUTRA                    CGI-InfoEUTRALogging,
        measResult-RLF-Report-EUTRA-r16        OCTET STRING
    }
}
...
-- TAG-UEINFORMATIONRESPONSE-STOP
-- ASN1STOP
```

FIG. 15

```
-- ASN1START
-- TAG-RRCREESTABLISHMENTCOMPLETE-START
RRCReestablishmentComplete ::=      SEQUENCE {
    rrc-TransactionIdentifier       RRC-TransactionIdentifier,
    criticalExtensions              CHOICE {
        rrcReestablishmentComplete      RRCReestablishmentComplete-IEs,
        criticalExtensionsFuture        SEQUENCE {}
    }
}
RRCReestablishmentComplete-IEs ::= SEQUENCE {
    lateNonCriticalExtension        OCTET STRING                            OPTIONAL,
    nonCriticalExtension            RRCReestablishmentComplete-v16xy-IEs OPTIONAL
}
RRCReestablishmentComplete-v16xy-IEs ::= SEQUENCE {
    logMeasAvailable-r16            ENUMERATED {true}           OPTIONAL,
    logMeasAvailableBT-r16          ENUMERATED {true}           OPTIONAL,
    logMeasAvailableWLAN-r16        ENUMERATED {true}           OPTIONAL,
    connEstFailInfoAvailable-r16    ENUMERATED {true}           OPTIONAL,
    rlf-InfoAvailable-r16           ENUMERATED {true}           OPTIONAL,
    nonCriticalExtension            RRCReestablishmentComplete-r17-IEs
                                                                OPTIONAL
}
RRCReestablishmentComplete-r17-IEs ::=  SEQUENCE {
    dualRlfReportAvailable-r17       ENUMERATED {true}           OPTIONAL,
    lateNonCriticalExtension         OCTET STRING                OPTIONAL,
    nonCriticalExtension             SEQUENCE {}                 OPTIONAL
}
-- TAG-RRCREESTABLISHMENTCOMPLETE-STOP
-- ASN1STOP
```

FIG. 16A

```
-- ASN1START
-- TAG-UEINFORMATIONREQUEST-START
UEInformationRequest-r16 ::=    SEQUENCE {
    rrc-TransactionIdentifier      RRC-TransactionIdentifier,
    criticalExtensions             CHOICE {
        ueInformationRequest-r16       UEInformationRequest-r16-IEs,
        criticalExtensionsFuture       SEQUENCE {}
    }
}
UEInformationRequest-r16-IEs ::= SEQUENCE {
    idleModeMeasurementReq-r16     ENUMERATED{ffs}         OPTIONAL, -- Need N
    logMeasReportReq-r16           ENUMERATED {true}       OPTIONAL,
    connEstFailReportReq-r16       ENUMERATED {true}       OPTIONAL,
    ra-ReportReq-r16               ENUMERATED {true}       OPTIONAL,
    rlf-ReportReq-r16              ENUMERATED {true}       OPTIONAL,
    mobilityHistoryReportReq-r16   ENUMERATED {true}       OPTIONAL,
    lateNonCriticalExtension       OCTET STRING            OPTIONAL,
    nonCriticalExtension           UEInformationRequest-r17-IEs   OPTIONAL
}
UEInformationRequest-r17-IEs ::= SEQUENCE {
    nrRlf-ReportReq-r17            ENUMERATED {true}       OPTIONAL,
    lteRlf-ReportReq-r17           ENUMERATED {true}       OPTIONAL,
    bothRlf-ReportReq-r17          ENUMERATED {true}       OPTIONAL,
    lateNonCriticalExtension       OCTET STRING            OPTIONAL,
    nonCriticalExtension           SEQUENCE {}             OPTIONAL
}
-- TAG-UEINFORMATIONREQUEST-STOP
-- ASN1STOP
```

FIG. 16B

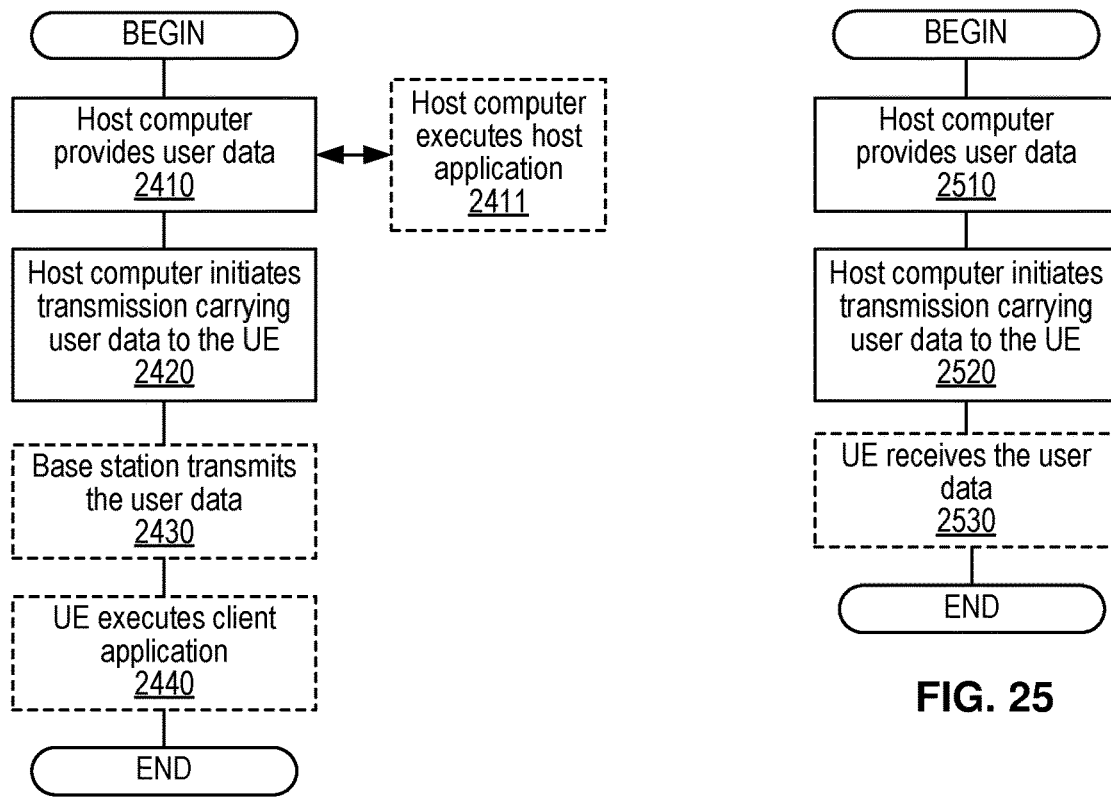
FIG. 24
FIG. 25
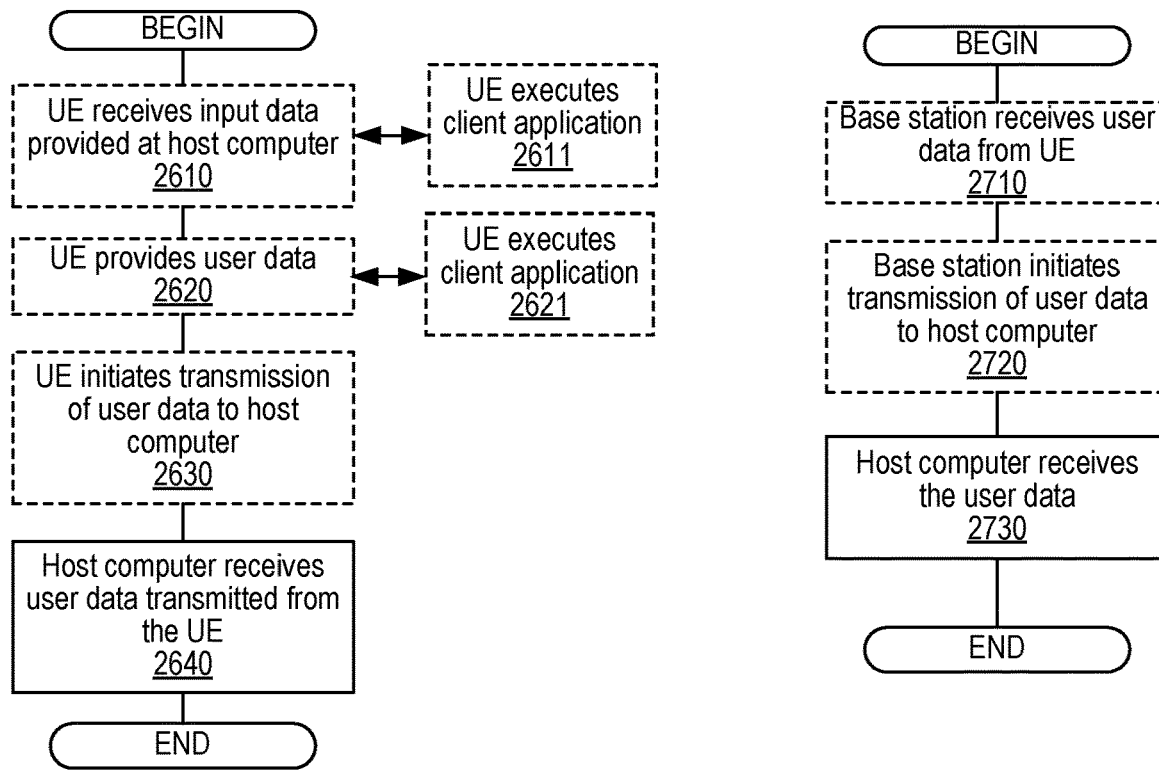
FIG. 26
FIG. 27

METHODS AND APPARATUSES FOR REPORTING OF MULTIPLE RADIO LINK FAILURES

TECHNICAL FIELD

The present disclosure relates generally to wireless networks and more specifically to improved techniques for reporting of radio link failures (RLFs) experienced by user equipment (UEs) in wireless networks.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or Global System for Mobile Communications (GSM) Enhanced Data rates for GSM Evolution (EDGE) Radio Access Network (GERAN), as the third-generation ("3G") and second-generation ("2G") 3GPP RANs are commonly known.

E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g. where data transfer can occur). The UE returns to RRC_IDLE alter the connection with the network is released.

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0/SRB1 are also used for establishment and modification of data radio bearers (DRBs) that carry user data.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and other use cases.

5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

A common mobility procedure for UEs in RRC_CONNECTED state is handover (HO) between cells. A UE is handed over from a source or serving cell, provided by a source node, to a target cell provided by a target node. In general, for LTE (or NR), handover source and target nodes are different eNBs (or gNBs), although intra-node handover between different cells provided by a single eNB (or gNB) is also possible. Successful handovers enable the UE moves around in the network coverage area without excessive interruptions in data transmission.

Even so, handover and other mobility procedures can have various problems related to robustness. Failure of handover to a target cell may lead to the UE declaring radio link failure (RLF) in the source cell. A UE logs relevant information at the time of RLF and can later report such information to the network via a target cell to which the UE ultimately connects (e.g., after reestablishment). The reported information can include Radio Resource Management (RRM) measurements of various neighbor cells prior to the mobility operation (e.g., handover). In particular, the UE can indicate that it has an RLF report and, upon network request (e.g., by the node serving the UE's new serving cell), the UE sends the entire report.

SUMMARY

However, conventional RLF reporting techniques do not enable the UE to report all of the information it may have logged in relation to an RLF and/or a HO failure (HOF). This can cause various problems, issues, and/or difficulties for the network and for UEs.

Embodiments of the present disclosure provide specific improvements to RLF reporting in a wireless network, such as by facilitating solutions to overcome exemplary problems summarized above and described in more detail below.

Embodiments of the present disclosure include methods (e.g., procedures) for a UE (e.g., wireless device, IoT device, modem, etc. or component thereof) to report RLF in a wireless network (e.g., E-UTRAN, NG-RAN).

These exemplary methods can include sending, to a radio network node (RNN) in the wireless network, a first message including: a first RLF report related to an RLF that occurred in a cell of the wireless network, and a second indication of availability of one or more further RLF reports stored by the UE. In some embodiments, the second indication of availability can be included in the first RLF report. In some embodiments, the first message can be a UEInformationResponse message.

These exemplary methods can also include receiving, from the RNN, a second request for at least a portion of the stored RLF reports indicated by the second indication. In some embodiments, the second request can be a UEInformationRequest message.

These exemplary methods can also include sending, to the RNN, a second response including a second RLF report of the stored RLF reports. In some embodiments, the second response including the second RLF report can be a UEInformationResponse message. In some embodiments, the second response can also include a third indication of availability of a third RLF report of the stored RLF reports.

In some embodiments, the second indication also indicates respective radio access technology (RATs) associated with the one or more further RLF reports stored by the UE. In some embodiments, the second indication can comprise a first type of indication when indicating availability of a single further RLF report stored by the UE, or a second type of indication when indicating availability of a plurality of further RLF reports stored by the UE.

In some embodiments, the first and second RLF reports can be associated with different RATs, such as LTE and NR. In some of these embodiments, these exemplary methods can also include: upon establishing a connection with a cell served by the RNN, sending to the RNN a first indication of availability of a plurality of stored RLF reports; and receiving, from the RNN, a first request for at least a portion of the stored RLF reports indicated by the first indication. The first message can be sent in response to the first request.

In some variants, the first request can be a UEInformationRequest message.

In some variants, the first indication can indicate that the stored RLF reports are associated with a plurality of different RATs. In such variants, the first request can indicate a particular one or more of the different RATs for which stored RLF reports are requested. In some further variants, the first request indicates first and second RATs (e.g., NR and LTE) for which stored RLF reports are requested. In such case, the first RLF report can be associated with the first RAT and the first message can also include a further first RLF report associated with the second RAT.

In other variants, the first indication indicates availability of only the stored RLF reports that are associated with a single RAT, and the first message includes a plurality of RLF reports associated with the single RAT. In some further variants, the single RAT is a RAT used for the connection with the RNN. In some further variants, the second indication (i.e., in the first message) indicates availability of the stored RLF reports that are associated with RATs other than the RAT used for the connection with the RNN.

In other variants, the second indication (i.e., in the first message) indicates availability of one or more stored RLF reports related to respective one or more RLFs that occurred after an RLF related to the first RLF report.

Other embodiments include methods (e.g., procedures) to receive RLF reports from UEs in a wireless network. These exemplary methods can be performed by a radio network node (RNN, e.g., base station, eNB, gNB, ng-eNB, en-gNB, etc., or component thereof) serving a cell in a wireless network (e.g., E-UTRAN, NG-RAN).

These exemplary methods can include receiving, from a UE, a first message including: a first RLF report related to an RLF that occurred in a cell of the wireless network, and a second indication of availability of one or more further RLF reports stored by the UE. In some embodiments, the second indication of availability can be included in the first RLF report. In some embodiments, the first message can be a UEInformationResponse message.

These exemplary methods can also include sending, to the UE, a second request for at least a portion of the stored RLF reports indicated by the second indication. In some embodiments, the second request can be sent in a UEInformationRequest message. These exemplary methods can also include receiving, from the UE, a second response including a second RLF report of the stored RLF reports. In some embodiments, the second response including the second RLF report can be a UEInformationResponse message. In some embodiments, the second response can also include a third indication of availability of a third RLF report of the stored RLF reports.

In some embodiments, the second indication also indicates respective RATs associated with the one or more further RLF reports stored by the UE. In some embodiments, the second indication can comprise a first type of indication when indicating availability of a single further RLF report stored by the UE, or a second type of indication when indicating availability of a plurality of further RLF reports stored by the UE.

In some embodiments, the stored RLF reports can be associated with a plurality of different RATs, such as LTE and NR. In some of these embodiments, these exemplary methods can also include: sending the first RLF report to a first RNN, in the wireless network, that is associated with the same RAT as the first RLF report; and sending the second RLF report to a second RNN, in the wireless network, that is associated with the same RAT as the second RLF report. In some variants, the first RLF report can be sent in a first inter-node message via a first inter-node interface while the second RLF report can be sent in a second inter-node message via a second inter-node interface.

In some of these embodiments, these exemplary methods can also include: upon establishing a connection with the UE, receiving from the UE a first indication of availability of a plurality of stored RLF reports; and sending, to the UE, a first request for at least a portion of the stored RLF reports indicated by the first indication. The first message can be received in response to the first request.

In some variants, the first request can be a UEInformationRequest message.

In some variants, the first indication can indicate that the stored RLF reports are associated with a plurality of different RATs. In such variants, the first request can indicate a particular one or more of the different RATs for which stored RLF reports are requested. In some further variants, the first request indicates first and second RATs (e.g., NR and LTE) for which stored RLF reports are requested. In such case, the first RLF report can be associated with the first RAT and the first message can also include a further first RLF report associated with the second RAT.

In other variants, the first indication can indicate availability of only the stored RLF reports that are associated with a single RAT, and the first message includes a plurality of RLF reports associated with the single RAT. In some variants, the single RAT is a RAT used for the connection with the RNN. In some further variants, the second indication (i.e., in the first message) indicates availability of the stored RLF reports that are associated with RATs other than the RAT used for the connection with the RNN.

In other variants, the second indication (i.e., in the first message) indicates availability of one or more stored RLF reports related to respective one or more RLFs that occurred after an RLF related to the first RLF report.

Other embodiments include UEs (e.g., wireless devices, IoT devices, etc. or component(s) thereof) and RNNs (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or RNNs to perform operations corresponding to any of the exemplary methods described herein.

These and other embodiments described herein can enable a network to obtain multiple RLF reports stored at the UE in a short duration that is proximate in time with the actual conditions causing the RLF. This reduces the likelihood of losing RLF reports due to the UE deletion after 48 hours or the UE overwriting when there is another RLF on the same RAT. Accordingly, the network can obtain more information about RLF(s), which can facilitate better network planning and/or corrective action toward conditions that caused the RLF(s).

These and other objects, features, and advantages of embodiments of the present disclosure will become apparent upon reading the following Detailed Description in view of the Drawings briefly described below.

BRIEF DESCRIPTION OF THE DRAWINGS

FIG. 10 shows an exemplary ASN.1 data structure for configuring a UE RLF procedure.

FIGS. 11-13 show exemplary ASN.1 data structures for messages or information elements (IEs) used for indicating, requesting, and reporting information logged by a UE in relation to an RLF.

FIGS. 14A-B show exemplary ASN.1 data structures for two variants of a UEInformationResponse message, according to various embodiments of the present disclosure.

FIG. 15 shows an exemplary ASN.1 data structure for another variant of a UEInformationResponse message, according to various embodiments of the present disclosure.

FIGS. 16A-B show exemplary ASN.1 data structures for RRCReestablishmentComplete and UEInformationRequest messages, respectively, according to various embodiments of the present disclosure.

FIGS. 24-27 are flow diagrams of exemplary methods (e.g., procedures) for transmission and/or reception of user data, according to various embodiments of the present disclosure.

DETAILED DESCRIPTION

Figure 1:
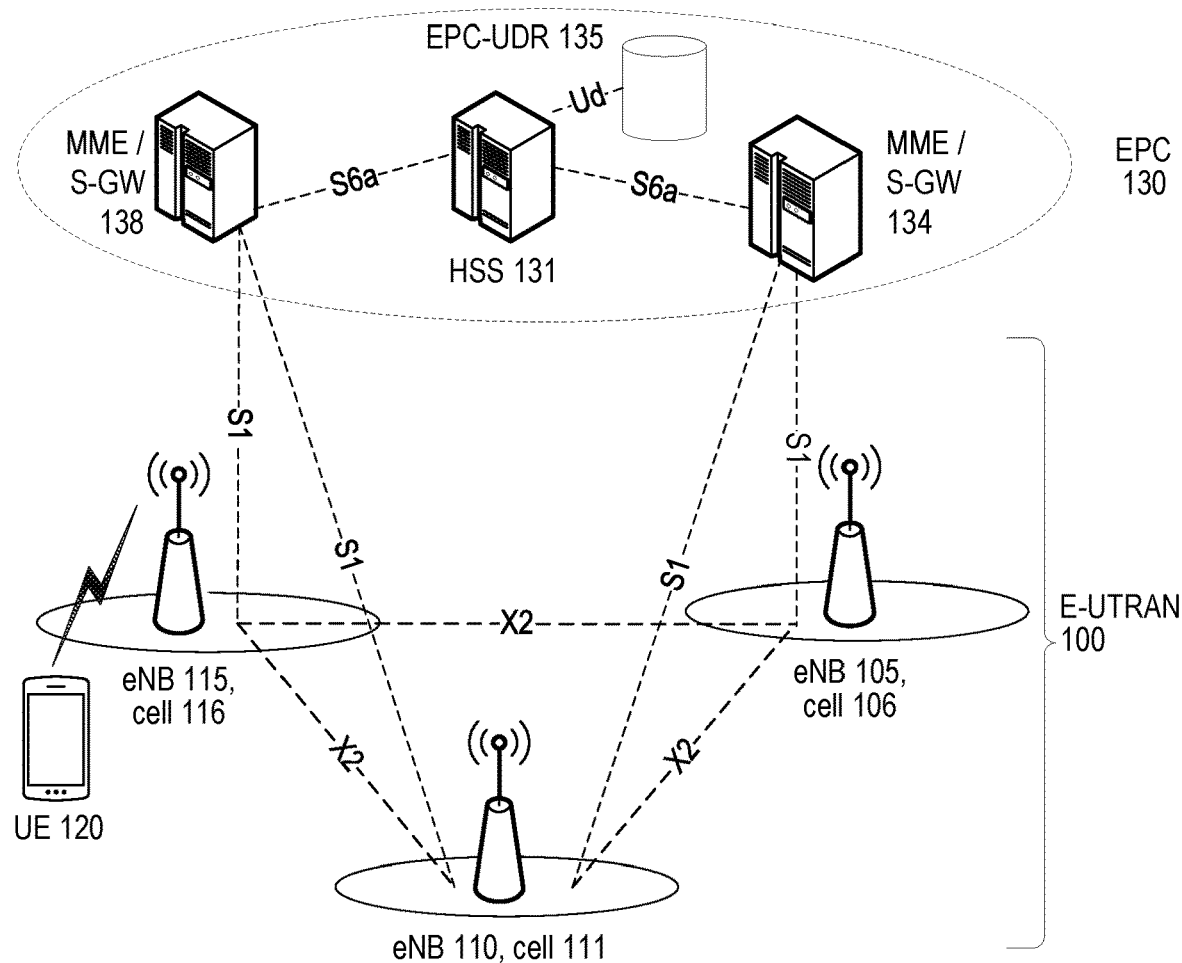
FIG. 1 shows a high-level view of an exemplary LTE network architecture.
Figure 2:
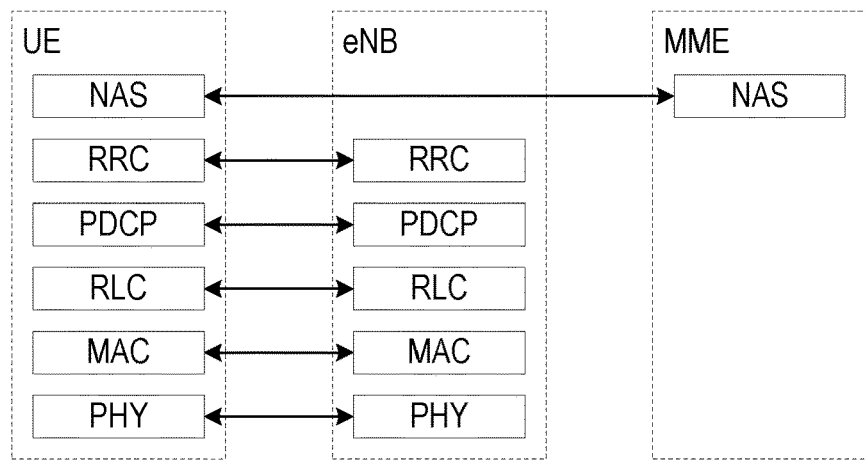
FIG. 2 shows an exemplary configuration of an LTE control plane (CP) protocol stack.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, conventional radio link failure (RLF) reporting techniques do not enable the UE to report all of the information it may have logged in relation to an RLF and/or a handover failure (HOF), which can cause various problems, issues, and/or difficulties for the network and for UEs. This is discussed in more detail below, after the following description of NR network architecture and various dual connectivity (DC) arrangements.

Figure 3:
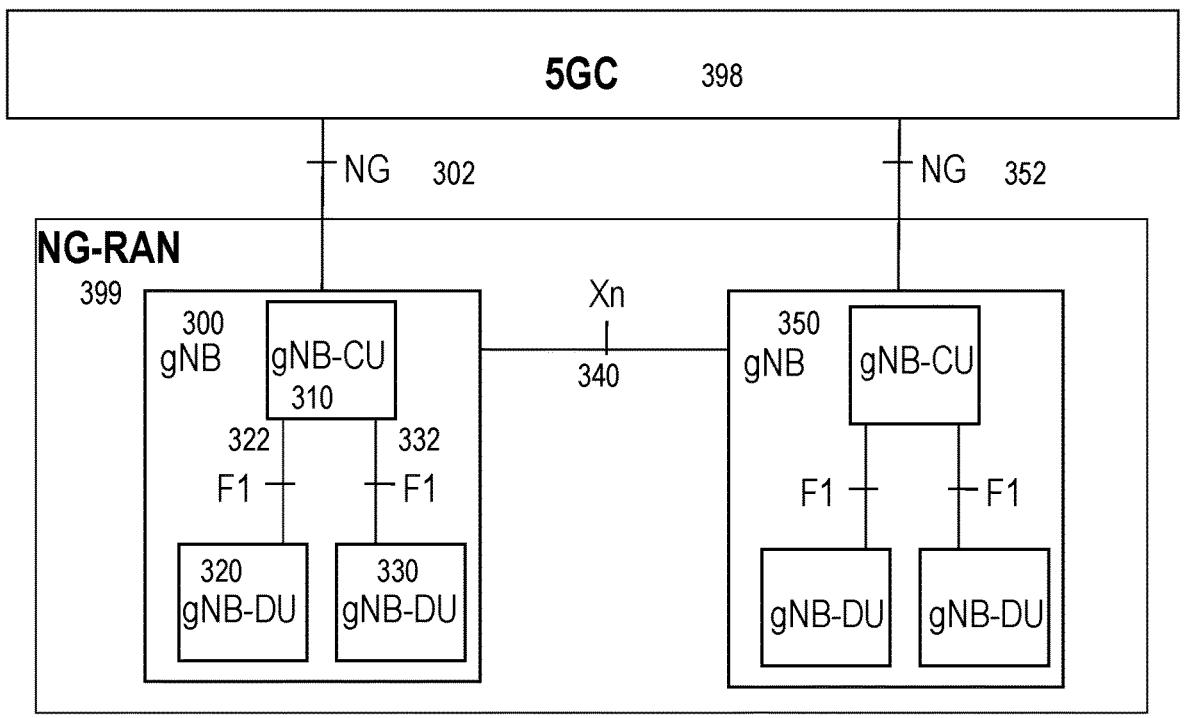
FIG. 3 shows a high-level view of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
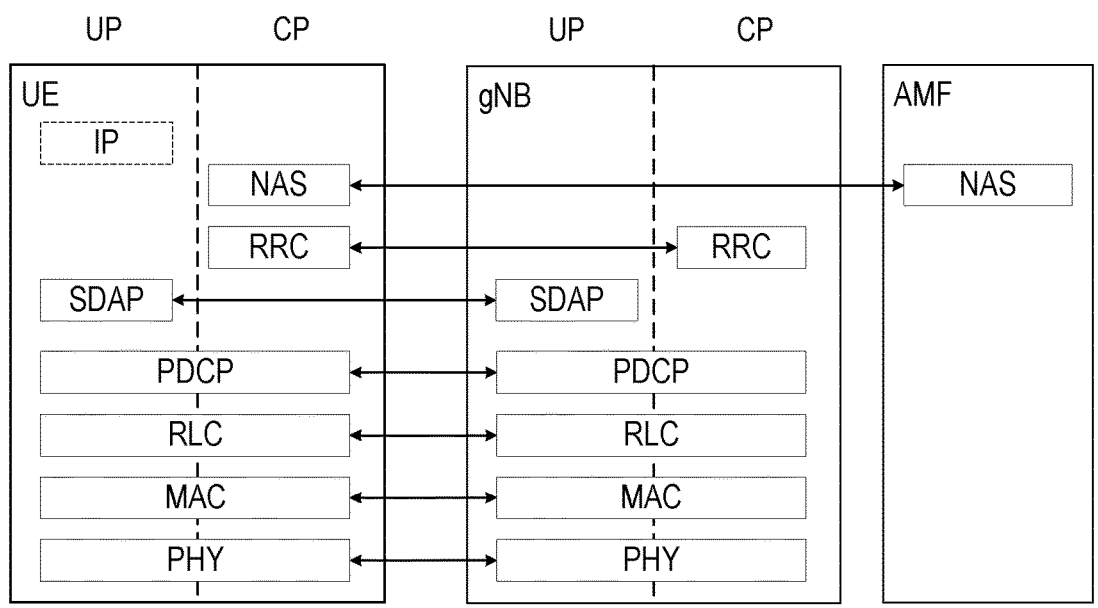
FIG. 4 shows an exemplary configuration of NR user plane (UP) and CP protocol stacks.

FIG. 4 shows an exemplary configuration of NR user plane (UP) and control plane (CP) protocol stacks between a UE, a gNB, and an access and mobility management function (AMF) in the 5GC. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On UP side, the Service Data Adaptation Protocol (SDAP) layer handles quality-of-service (QoS). This includes mapping between QoS flows and Data Radio Bearers (DRBs) and marking QoS flow identifiers (QFI) in UL and DL packets. On CP side, the non-access stratum (NAS) layer is between UE and AMF and handles UE/gNB authentication, mobility management, and security control.

The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

3GPP LTE Rel-10 supports bandwidths larger than 20 MHz. One important Rel-10 requirement is backward compatibility with LTE Rel-8, including spectrum compatibility. As such, a wideband LTE Rel-10 carrier (e.g., wider than 20 MHz) should appear as a plurality of carriers ("component carriers" or CCs) to an LTE Rel-8 ("legacy") terminal. Legacy terminals can be scheduled in all parts of the wideband LTE Rel-10 carrier. One way to achieve this is by Carrier Aggregation (CA), whereby a Rel-10 terminal can receive multiple CCs, each preferably having the same structure as a Rel-8 carrier.

Additionally, LTE Rel-12 introduced dual connectivity (DC) whereby a UE can be connected to two network nodes simultaneously, thereby improving connection robustness and/or capacity. In DC, an RRC_CONNECTED UE consumes radio resources provided by at least two different network nodes (or points) connected to one another with a non-ideal backhaul. In LTE, these two network nodes are referred to as "Master eNB" (MeNB) and "Secondary eNB" (SeNB).

In LTE DC, a UE is configured with a Master Cell Group (MCG) associated with the MeNB and a Secondary Cell Group (SCG) associated with the SeNB. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MeNB provides system information (SI) and terminates the control plane connection towards the UE and, as such, is the controlling node of the UE, including handovers to and from SeNBs. For example, the MeNB terminates the connection between the eNB and the MME for the UE. An SeNB provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. In addition, either or both of the MCG and the SCG can include multiple cells working in CA.

Both MeNB and SeNB can terminate the user plane (UP) to the UE. In particular, the LTE DC UP includes three different types of bearers. MCG bearers are terminated in the MeNB, and the SeNB is not involved in the transport of UP data for MCG bearers. Likewise, SCG bearers are terminated in the SeNB, and the MeNB is not involved in the transport of UP data for SCG bearers. Finally, split bearers (and their corresponding S1-U connections to S-GW) are also terminated in MeNB. However, PDCP data is transferred between the MeNB and the SeNB via X2-U. Both SeNB and MeNB are involved in transmitting data for split bearers.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

Figure 5:
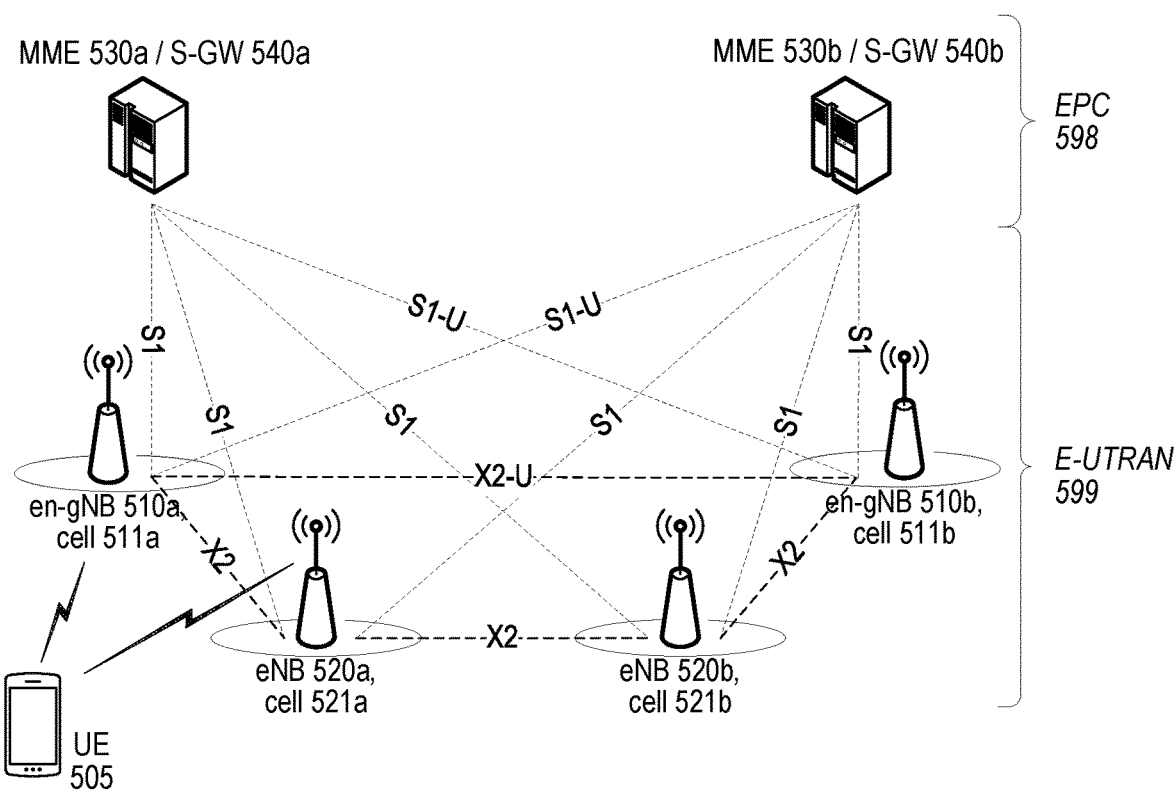
FIGS. 5-6 show high-level views of exemplary network architectures that support multi-RAT dual connectivity (MR-DC) using EPC and 5GC, respectively.

FIG. 5 shows a high-level view of an exemplary network architecture that supports EN-DC, including an E-UTRAN 599 and an EPC 598. As shown in the figure, E-UTRAN 599 can include en-gNBs 510 (e.g., 510a,b) and eNBs 520 (e.g., 520a,b) that are interconnected with each other via respective X2 (or X2-U) interfaces. The eNBs 520 can be similar to those shown in FIG. 1, while the ng-eNBs can be similar to the gNBs shown in FIG. 3 except that they connect to EPC 598 via an S1-U interface rather than to a 5GC via an X2 interface. The eNBs also connect to EPC 598 via an S1 interface, similar to the arrangement shown in FIG. 1. More specifically, en-gNBs 510 (e.g., 510a,b) and eNBs 520 (e.g., 520a,b) connect to MMEs (e.g., MMEs 530a,b) and S-GWs (e.g., S-GWs 540a,b) in EPC 598.

Each of the en-gNBs and eNBs can serve a geographic coverage area including one more cells, including cells 511a-b and 521a-b shown as exemplary in FIG. 5. Depending on the particular cell in which it is located, a UE 505 can communicate with the en-gNB or eNB serving that particular cell via the NR or LTE radio interface, respectively. In addition, UE 505 can be in EN-DC connectivity with a first cell served by an eNB and a second cell served by an en-gNB, such as cells 520a and 510a shown in FIG. 5.

Figure 6:
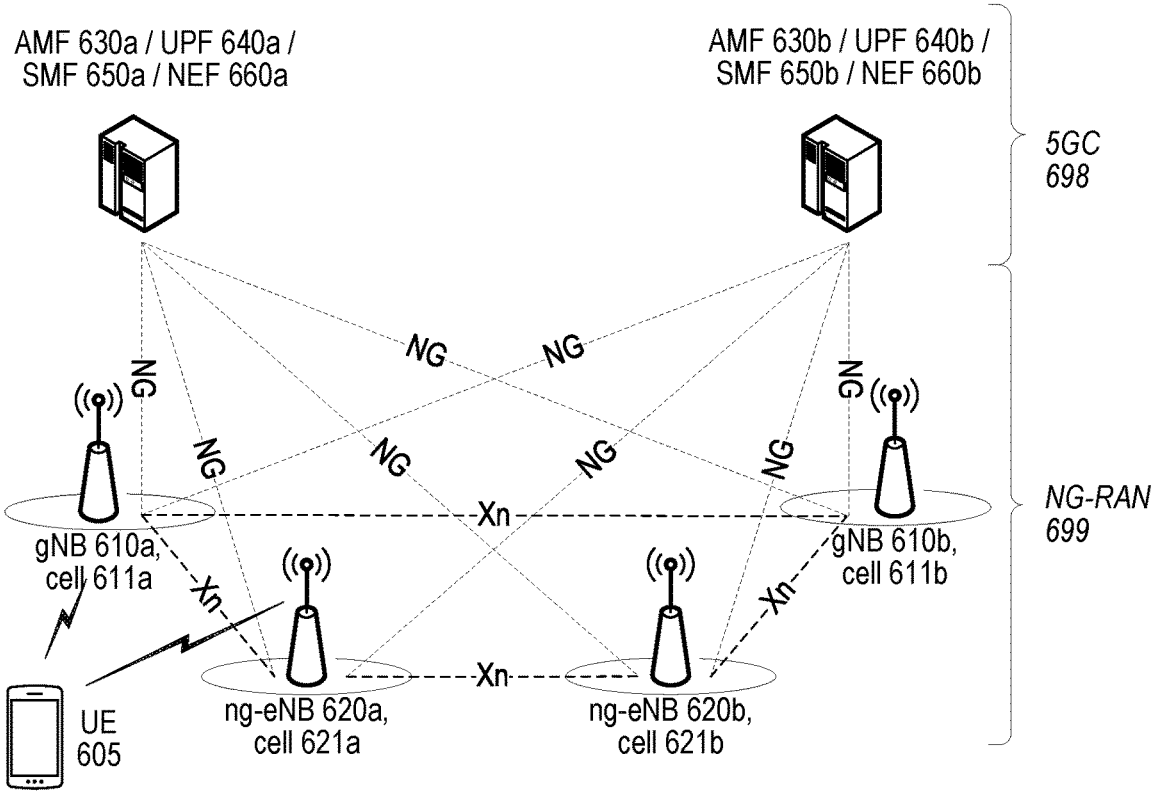

FIG. 6 shows a high-level view of an exemplary network architecture that supports MR-DC configurations based on a 5GC. More specifically, FIG. 6 shows an NG-RAN 699 and a 5GC 698. NG-RAN 699 can include gNBs 610 (e.g., 610a,b) and ng-eNBs 620 (e.g., 620a,b) that are interconnected with each other via respective Xn interfaces. The gNBs and ng-eNBs are also connected via the NG interfaces to 5GC 698, more specifically to the AMF (Access and Mobility Management Function) 630 (e.g., AMFs 630a,b) via respective NG-C interfaces and to the UPF (User Plane Function) 640 (e.g., UPFs 640a,b) via respective NG-U interfaces. Moreover, the AMFs 630a,b can communicate with one or more session management functions (SMFs, e.g., SMFs 650a,b) and network exposure functions (NEFs, e.g., NEFs 660a,b).

Each of the gNBs 610 can be similar to those shown in FIG. 3, while each of the ng-eNBs can be similar to the eNBs shown in FIG. 1 except that they connect to 5GC 698 via an NG interface rather than to EPC via an S1 interface. Each of the gNBs and ng-eNBs can serve a geographic coverage area including one more cells, including cells 611a-b and 621a-b shown as exemplary in FIG. 6. The gNBs and ng-eNBs can also use various directional beams to provide coverage in the respective cells. Depending on the particular cell in which it is located, a UE 605 can communicate with the gNB or ng-eNB serving that particular cell via the NR or LTE radio interface, respectively. In addition, UE 605 can be in MR-DC connectivity with a first cell served by an ng-eNB and a second cell served by a gNB, such as cells 620a and 610a shown in FIG. 6.

Figure 7:
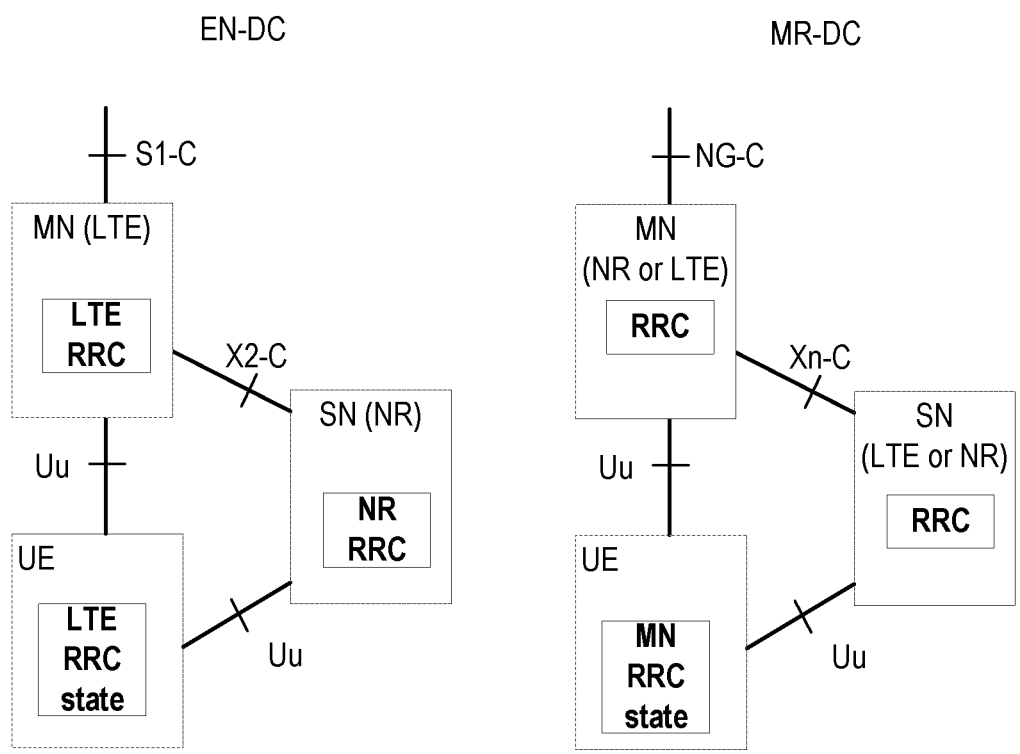
FIG. 7 is a block diagram showing a high-level comparison of control plane (CP) architectures for MR-DC using EPC and 5GC.

FIG. 7 is a block diagram showing a high-level comparison of control plane (CP) architectures in EN-DC with EPC (e.g., FIG. 5) and MR-DC with 5GC (e.g., FIG. 6). In either case, the UE has a single RRC state based on the MN RRC and a single CP connection towards the CN. RRC PDUs generated by the SN can be transported via the MN to the UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

As shown in FIG. 7, each of MN and SN has an RRC entity for creating RRC Information Elements (IE) and messages for configuring the UE. Since the SN is responsible for its own resources, it provides the UE with the Secondary Cell Group (SCG) configuration in an RRC message and also the radio bearer configuration in an IE, for all bearers that are terminated in the SN. The MN in turn creates the Master Cell Group (MCG) configuration and the radio bearer configuration for all bearers terminated in the MN. The cell group configuration includes the configuration of L1 (physical layer), MAC and RLC. The radio bearer configuration includes the configuration of PDCP (and SDAP in case of 5GC).

Returning to discussion of RLF, a network can configure a UE in RRC_CONNECTED state to perform and report RRM measurements that assist network-controlled mobility decisions such as UE handover between cells, SN change, etc. The UE may lose coverage in its current serving cell (e.g., PCell in DC) and attempt handover to a target cell. Similarly, a UE in DC may lose coverage in its current PSCell and attempt an SN change. Other events may trigger other mobility-related procedures.

An RLF procedure is typically triggered in the UE when something unexpected happens in any of these mobility-related procedures. The RLF procedure involves interactions between RRC and lower layer protocols such as PHY (or L1), MAC, RLC, etc. including radio link monitoring (RLM) on L1.

In case of handover failure (HOF) and RLF, the UE may take autonomous actions such as selecting a cell and initiating reestablishment to remain reachable by the network. In general, a UE declares RLF only when the UE realizes that there is no reliable communication channel (or radio link) available between itself and the network, which can result in poor user experience. Also, reestablishing the connection requires signaling with a newly selected cell (e.g., random access procedure, exchanging various RRC messages, etc.), introducing latency until the UE can again reliably transmit and/or receive user data with the network.

Since RLF leads to reestablishment in a new cell and degradation of UE/network performance and end-user experience, it is in the interest of the network to understand the reasons for UE RLF and to optimize mobility-related parameters (e.g., trigger conditions of measurement reports) to reduce, minimize, and/or avoid subsequent RLFs. Before Rel-9 mobility robustness optimizations (MRO), only the UE was aware of radio quality at the time of RLF, the actual reason for declaring RLF, etc. To identify the RLF cause, the network requires more information from the UE and from the neighboring base stations (e.g., eNBs).

The principle of RLM is similar in LTE and NR. In general, the UE monitors link quality of the UE's serving cell (i.e., SpCell) and uses that information to decide whether the UE is in-sync (IS) or out-of-sync (OOS) with respect to that serving cell. In LTE, RLM is carried out by the UE measuring downlink reference signals (e.g., CRS) in RRC_CONNECTED state. If RLM (i.e., by L1/PHY) indicates number of consecutive OOS conditions to the UE RRC layer, then RRC starts a radio link failure (RLF) procedure and declares RLF after expiry of a timer (e.g., T310). The L1 RLM procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with to exemplary values of 10% and 2%, respectively. In NR, the network can define the RS type (e.g., CSI-RS and/or SSB), exact resources to be monitored, and even the BLER target for IS and OOS indications.

Figure 8:
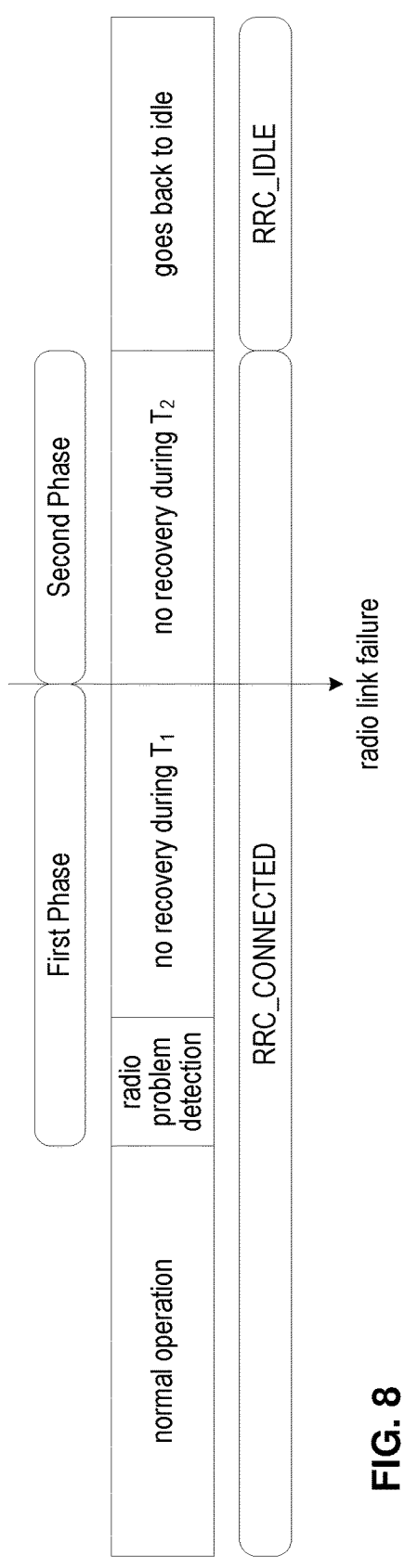
FIGS. 8-9 illustrate various aspects of UE's operation during an exemplary radio link failure (RLF) procedure in LTE and NR.

FIG. 8 shows a high-level timing diagram illustrating the two phases of an RLF procedure in LTE and NR. The first phase starts upon radio problem detection and leads to radio link failure detection after no recovery is made during a period T1. The second phase starts upon RLF detection or handover failure and ends with the UE returning to RRC_IDLE if no recovery is made during a period T2.

Figure 9:
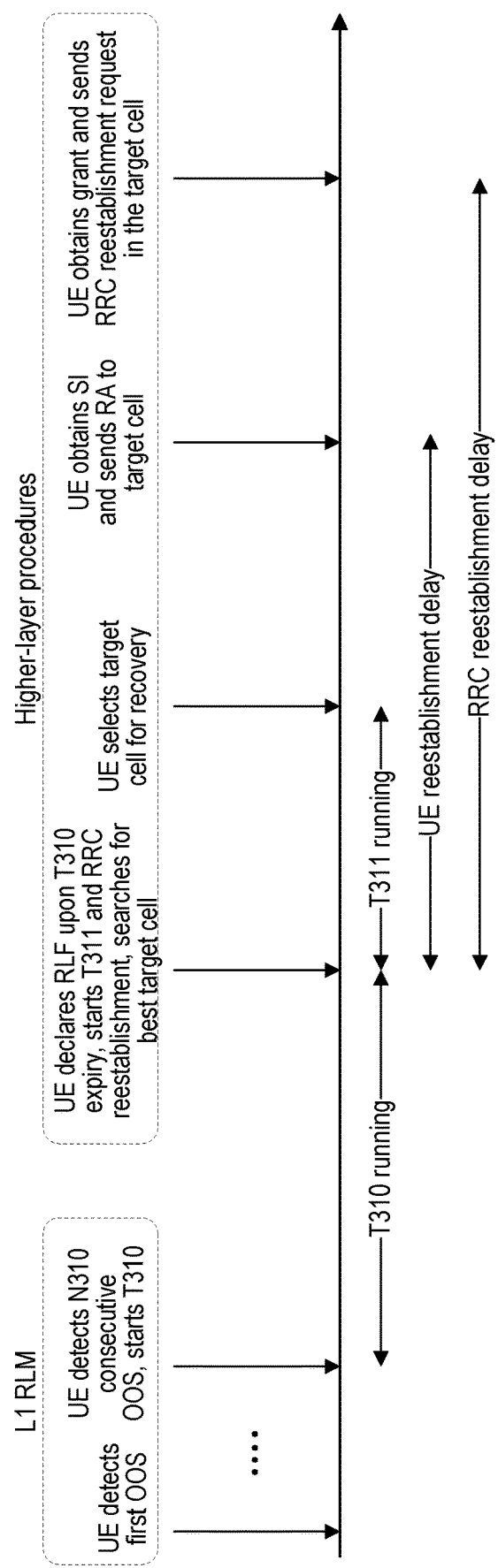

FIG. 9 shows a more detailed version of the UE's operations during an exemplary RLF procedure, such as for LTE or NR. In this example, the UE detects N310 consecutive OOS conditions during L1 RLM procedures, as discussed above, and then initiates timer T310. Subsequent operations are performed by higher layers (e.g., RRC). After expiry of T310, the UE starts T311 and RRC reestablishment, searching for the best target cell. After selecting a target cell for reestablishment, the UE obtains SI for the target cell and performs a random access (e.g., via RACH). The duration after T310 expiry until this point can be considered the UE's reestablishment delay. Ultimately, the UE obtains access to the target cell and sends an RRC Reestablishment Request message to the target cell. The duration after T310 expiry until this point can be considered the total RRC reestablishment delay. If the UE does not successfully reestablish in a target cell before expiration of T311, the UE enters RRC_IDLE and releases its connection to the network.

The timers and counters described above are further described in Tables 1-2 below, respectively. For NR-DC and NGEN-DC, T310 is used for both PCell/MCG and PSCell/SCG. For LTE-DC and NE-DC (i.e., where SN is eNB), T313 is used for PSCell/SCG. The UE reads the timer values from system information (SI) broadcast in the UE's SpCell. Alternatively, the network can configure the UE with UE-specific values of the timers and constants via dedicated RRC signaling (i.e., specific values sent to specific UEs via respective messages). FIG. 10 shows an exemplary ASN.1 data structure that defines an RRC RLF-TimersAndConstants information element (IE) containing UE-specific timers and constants for NR.

TABLE 1

| Timer | Start | Stop | At expiry |
|---|---|---|---|
| T310 | Upon detecting physical layer problems for the SpCell i.e., upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRCIDLE else: initiate the connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |
| T313 | Upon detecting physical layer problems for the PSCell i.e., upon receiving N313 consecutive out-of-sync | Upon receiving N314 consecutive in-sync indications from lower layers for the PSCell, upon initiating the connection re-establishment procedure, upon SCG release and upon receiving RRCConnectionReconfiguration | Inform E-UTRAN about the SCG radio link failure by initiating the SCG failure information procedure as specified in 5.6.13. |

TABLE 1-continued

| Timer | Start | Stop | At expiry |
|---|---|---|---|
| | indications from lower layers | including MobilityControlInfoSCG | |

TABLE 2

| Constant | Usage |
|---|---|
| N310 | Maximum number of consecutive "out-of-sync" indications for the SpCell received from lower layers |
| N311 | Maximum number of consecutive "in-sync" indications for the SpCell received from lower layers |
| N313 | Maximum number of consecutive "out-of-sync" indications for the PSCell received from lower layers (for LTE SN) |

The reason for introducing the timers and counters listed above is to add some filtering, delay, and/or hysteresis to a UE's determination of failure and/or recovery of a radio link with a serving cell. These parameters avoid a UE abandoning a connection prematurely due to a brief or temporary reduction in link quality that could be recovered by the UE (e.g., before T310 expires, before the counter value N310, etc.). In general, this improves user experience.

In addition to physical layer issues described above, a UE can declare RLF based on any of the following events:
- upon random access problem indication from MCG MAC layer;
- upon indication from MCG RLC that the maximum number of retransmissions has been reached;
- when connected as an Integrated Access Backhaul (IAB) node, upon backhaul RLF indication received from the MCG (i.e., on the link to a parent node); or
- when operating in unlicensed spectrum, upon consistent uplink listen-before-talk (LBT) failure indication from MCG MAC layer.

Upon detecting an RLF, the UE stores the RLF report in a UE variable call varRLF-Report and retains it in memory for up to 48 hours, after which it may discard the information. An exemplary procedure for UE actions in relation to detection and response to RLF is described by the following excerpt from 3GPP TS 38.331. Unless specifically noted, all section references are to sections in 3GPP TS 38.331.

\*\*\* Begin excerpt from 3GPP TS 38.331 \*\*\*
5.3.10.3 Detection of radio link failure
The UE shall:
1> if dapsConfig is configured for any DRB:
. . .
1> else:
  2> upon T310 expiry in PCell; or
  2> upon T312 expiry in PCell; or
  2> upon random access problem indication from MCG MAC while neither T300, T301, T304, T311 nor T319 are running; or
  2> upon indication from MCG RLC that the maximum number of retransmissions has been reached; or
  2> if connected as an IAB-node, upon BH RLF indication received on BAP entity from the MCG; or
  2> upon consistent uplink LBT failure indication from MCG MAC while T304 is not running:
    3> if the indication is from MCG RLC and CA duplication is configured and activated, and for the corresponding logical channel allowedServingCells only includes SCell(s):
      4> initiate the failure information procedure as specified in 5.7.5 to report RLC failure.
    3> else:
      4> consider radio link failure to be detected for the MCG i.e., RLF;
      4> discard any segments of segmented RRC messages stored according to 5.7.6.3;
      4> store the following radio link failure information in the VarRLF-Report by setting its fields as follows:
        <specific contents of RLF report omitted for brevity>
      4> if AS security has not been activated:
        5> perform the actions upon going to RRC_IDLE as specified in 5.3.11, with release cause 'other';
      4> else if AS security has been activated but SRB2 and at least one DRB or, for IAB, SRB2, have not been setup:
        5> perform the actions upon going to RRC_IDLE as specified in 5.3.11, with release cause 'RRC connection failure';
      4> else:
        5> if T316 is configured; and
        5> if SCG transmission is not suspended; and
        5> if PSCell change is not ongoing (i.e., timer T304 for the NR PSCell is not running in case of NR-DC or timer T307 of the E-UTRA PSCell is not running as specified in TS 36.331 [10], clause 5.3.10.10, in NE-DC):
          6> initiate the MCG failure information procedure as specified in 5.7.3b to report MCG radio link failure.
        5> else:
          6> initiate the connection re-establishment procedure as specified in 5.3.7.
\*\*\* End excerpt from 3GPP TS 38.331 \*\*\*

When sending certain RRC messages such as RRCReconfigurationComplete, RRCReestablishment-Complete, RRCSetupComplete, and RRCResumeComplete, the UE can indicate it has a stored RLF report by setting a rlf-InfoAvailable field to "true". An exemplary procedure for UE reporting of RLF in an RRCSetupComplete message is described by the following excerpt from 3GPP TS 38.331. Unless specifically noted, all section references are to sections in 3GPP TS 38.331. As illustrated in the following specification text, the UE includes rlf-InfoAvailable in the RRCSetupComplete message if either an NR RLF report or an LTE RLF report is available. However, the UE does not indicate which type of report is available.

\*\*\* Begin excerpt from 3GPP TS 38.331 \*\*\*
5.3.3.4 Reception of the RRCSetup by the UE
The UE shall perform the following actions upon reception of the RRCSetup:
1> consider the current cell to be the PCell;
1> set the content of RRCSetupComplete message as follows:

2> if the UE has radio link failure or handover failure information available in VarRLF-Report and if the RPLMN is included in plmn-IdentityList stored in VarRLF-Report:
   3> if reconnectCellID in Var RLF-Report is not set:
      4> set timeUntilReconnection in VarRLF-Report to the time that elapsed since the last radio link or handover failure;
      4> set nrReconnectCellId in reconnectCellID in VarRLF-Report to the global cell identity and the tracking area code of the PCell;
   3> include rlf-InfoAvailable in the RRCSetupComplete message;
2> if the UE has radio link failure or handover failure information available in VarRLF-Report of TS 36.331 [10]:
   3> if reconnectCellID in Var RLF-Report of TS 36.331[10] is not set:
      4> set timeUntilReconnection in VarRLF-Report of TS 36.331[10] to the time that elapsed since the last radio link or handover failure in LTE;
      4> set nrReconnectCellId in reconnectCellID in VarRLF-Report of TS 36.331[10] to the global cell identity and the tracking area code of the PCell;
   3> if the UE is capable of cross-RAT RLF reporting and if the RPLMN is included in plmn-IdentityList stored in VarRLF-Report of TS 36.331 [10]
      4> include rlf-InfoAvailable in the RRCSetupComplete message;
. . .

1> submit the RRCSetupComplete message to lower layers for transmission, upon which the procedure ends.
* End excerpt from 3GPP TS 38.331 *

To further illustrate this operation, FIG. 11 shows an ASN.1 data structure that defines an exemplary RRCReestablishment-Complete message for NR. Note that the rlf-InfoAvailable-r16 field is an optional field, but if present it is set to "true" indicating that an RLF report is available. Its absence indicates that the UE does not have an RLF report available. The network can request to the UE to send the report by sending a UEInformationRequest message with the rlf-ReportReq field set to "true". The UE will respond with a UEInformationResponse message that includes the indicated/requested RLF report.

FIG. 12 shows an ASN.1 data structure that defines an exemplary UEInformationRequest message for NR. Note that the rlf-ReportReq-r16 field in the UEInformationRequest-r16-IEs is an optional field, but if present it is set to "true" indicating that the network is requesting an RLF report from the UE. Its absence indicates that the network is not requesting an RLF report.

FIG. 13 shows an ASN.1 data structure that defines an exemplary UEInformationResponse message sent by the UE in response to a UEInformationRequest message. Note that the rlf-Report-r16 field is optional but if included, it contains various information logged by the UE for an RLF associated with an NR serving cell. Alternately, the rlf-Report-r16 field can include an octet string with various information logged by the UE for an RLF associated with an LTE serving cell.

Another point to note is that rlf-Report-r16 in FIG. 13 is structured as a choice between an nr-RLF-Report-r16 data structure and an eutra-RLF-Report-r16 data structure. As such, the UE can provide a report for NR or for LTE but not for both, even if available. This is also illustrated by the following excerpt from 3GPP TS 38.331, which is an exemplary procedure for UE response to a UEInformationRequest message for NR. Unless specifically noted, all section references are to sections in 3GPP TS 38.331.

* Begin excerpt from 3GPP TS 38.331 *
5.7.10.3 Reception of the UEInformationRequest message
Upon receiving the UEInformationRequest message, the UE shall, only after successful security activation:
. . .
1> if rlf-ReportReq is set to true:
   2> if the UE has radio link failure information or handover failure information available in VarRLF-Report and if the RPLMN is included in plmn-IdentityList stored in VarRLF-Report:
      3> set timeSinceFailure in VarRLF-Report to the time that elapsed since the last radio link or handover failure in NR;
      3> set the rlf-Report in the UEInformationResponse message to the value of rlf-Report in VarRLF-Report;
      3> discard the rlf-Report from VarRLF-Report upon successful delivery of the UEInformationResponse message confirmed by lower layers;
   2> else if the UE has radio link failure information or handover failure information available in VarRLF-Report of TS 36.331 [10] and if the RPLMN is included in plmn-IdentityList stored in VarRLF-Report of TS 36.331 [10]:
      3> set timeSinceFailure in VarRLF-Report of TS 36.331 [10] to the time that elapsed since the last radio link or handover failure in EUTRA;
      3> set the measResult-RLF-Report-EUTRA in the rlf-Report in the UEInformationResponse message to the value of rlf-Report in VarRLF-Report of TS 36.331 [10];
      3> discard the rlf-Report from VarRLF-Report of TS 36.331 [10] upon successful delivery of the UEInformationResponse message confirmed by lower layers;
. . .
* End excerpt from 3GPP TS 38.331 *

In the above procedure, the UE initially checks for an NR-related RLF report. If available, the UE sends that information to the network and skips the checking for an LTE-related RLF report. As such, the network does not learn that the UE has an LTE-related RLF report available until receiving a subsequent RRC message (e.g., RRCReestablishment-Complete, RRCReconfigurationComplete, RRCResumeComplete, or RRCSetupComplete) in which the UE can indicate that availability. This delay can be indeterminate such that the LTE-related RLF may no longer be (as) relevant when the UE ultimately provides it to the network. Furthermore, the UE will delete the stored LTE-related RLF report after 48 hours.

Accordingly, embodiments of the present disclosure provide techniques whereby a UE can indicate to the network the availability of a first RLF report(s) that it has stored, as well as information about the RAT (e.g., LTE or NR) associated with the first RLF report and/or for which the report has been encoded. In addition, such techniques allow the UE to indicate the availability of a second RLF report, e.g., in a UEInformationResponse message together with the first RLF report. Optionally, the UE can also provide information about the RAT associated with the second RLF report. Upon receiving such information, the network can request the UE (e.g., in a second UEInformationRequest message) to provide the second RLF report indicated as available.

Embodiments can provide various benefits, advantages, and/or solutions to problems described herein. For example, exemplary embodiments enable the network to fetch multiple RLF reports stored at the UE in a short duration that is proximate in time with the actual conditions causing the RLF. This reduces the likelihood of loss of RLF reports due to either UE deletion after 48 hours or overwriting when there is another RLF on the same RAT. Accordingly, the network can obtain more information about RLFs, which can facilitate better network planning and/or corrective action toward conditions that caused the RLF(s).

In some embodiments, the UE can indicate availability of a "multiple RLF report" containing one or more RLF reports associated with a single RAT, e.g., LTE or NR. In such embodiments the two RLF reports can be encoded separately, e.g., within the same RLF-report IE. Such separation allows the receiving RAN node to separate the two RLF Reports into an LTE RLF Report and an NR RLF Report and to include each RLF Report in appropriate RAN interface messages that are forwarded to other RAN nodes. The other RAN nodes may determine the failure cause associated with the received RLF Report and can use the UE-reported information for optimization of network configurations, e.g., to prevent further similar failures.

In other embodiments, the UE can indicate availability of a "dual RAT RLF report" containing two separate "multiple RLF reports" (as discussed above), each associated with a different RATs (e.g., one multiple RLF report associated with NR, one multiple RLF report associated with LTE/EUTRA). The RAN node receiving such RLF Reports may separate them and forward them to other RAN nodes as discussed above.

In some embodiments, when the UE sends the first RLF report, the UE can include an indication of the availability of a second RLF report, as summarized above. Similarly, when the UE sends the second RLF report, the UE can include an indication of the availability of a third RLF report, and so on. In some embodiments, each indication of availability can also include an indication of the RAT associated with the available report.

These embodiments are further illustrated by the following proposed text for 3GPP TS 38.331, which is an exemplary procedure for UE response to a UEInformationRequest message for NR. Underline is used to identify changes from existing text (e.g., excerpt above) according to these embodiments.

* Begin proposed text for 3GPP TS 38.331 *
5.7.10.3 Reception of the UEInformationRequest message
Upon receiving the UEInformationRequest message, the UE shall, only after successful security activation:
. . .
  1> if rlf-ReportReq is set to true:
    2> if the UE has radio link failure information or handover failure information available in VarRLF-Report and if the RPLMN is included in plmn-IdentityList stored in VarRLF-Report:
      3> set timeSinceFailure in VarRLF-Report to the time that elapsed since the last radio link or handover failure in NR;
      3> set the rlf-Report in the UEInformationResponse message to the value of rlf-Report in VarRLF-Report;
      3> if the UE has radio link failure information or handover failure information available in VarRLF-Report of TS 36.331 [10] and if the RPLMN is included in plmn-IdentityList stored in VarRLF-Report of TS 36.331 [10]:
        4> include rlf-InfoAvailable in the UEInformationResponse message;
      3> discard the rlf-Report from VarRLF-Report upon successful delivery of the UEInformationResponse message confirmed by lower layers;
    2> else if the UE has radio link failure information or handover failure information available in VarRLF-Report of TS 36.331 [10] and if the RPLMN is included in plmn-IdentityList stored in VarRLF-Report of TS 36.331 [10]:
      3> set timeSinceFailure in VarRLF-Report of TS 36.331 [10] to the time that elapsed since the last radio link or handover failure in EUTRA;
      3> set the measResult-RLF-Report-EUTRA in the rlf-Report in the UEInformationResponse message to the value of rlf-Report in VarRLF-Report of TS 36.331 [10];
      3> discard the rlf-Report from VarRLF-Report of TS 36.331 [10] upon successful delivery of the UEInformationResponse message confirmed by lower layers;
. . .
* End proposed text for 3GPP TS 38.331 *

These embodiments are further illustrated by FIG. 14A, which shows an exemplary ASN.1 data structure for a UEInformationResponse message that can sent by a UE, with an optional rlf-InfoAvailable-r17 field that (if included) indicates availability of an RLF report. FIG. 14B shows an exemplary ASN.1 data structure for another variant with an optional rlf-InfoAvailable-r17 field that (if included) indicates availability of RLF report(s) associated with NR, LTE/E-UTRAN, or both.

The following proposed text for 3GPP TS 38.331 illustrates another option for including an availability indication in a UE response to a UEInformationRequest message for NR. Underline is used to identify changes from existing text (e.g., excerpt above) according to these embodiments.

* Begin proposed text for 3GPP TS 38.331 *
5.7.10.3 Reception of the UEInformationRequest message
Upon receiving the UEInformationRequest message, the UE shall, only after successful security activation:
. . .
  1> if rlf-ReportReq is set to true:
    2> if the UE has radio link failure information or handover failure information available in VarRLF-Report and if the RPLMN is included in plmn-IdentityList stored in VarRLF-Report:
      3> set timeSinceFailure in VarRLF-Report to the time that elapsed since the last radio link or handover failure in NR;
      3> set the rlf-Report in the UEInformationResponse message to the value of rlf-Report in VarRLF-Report;
      3> if the UE has radio link failure information or handover failure information available in VarRLF-Report of TS 36.331 [10] and if the RPLMN is included in plmn-IdentityList stored in Var RLF-Report of TS 36.331 [10];
        4> set the rlf-InfoAvailable in the rlf-Report of UEInformationResponse message to true;
      3> discard the rlf-Report from Var RLF-Report upon successful delivery of the UEInformationResponse message confirmed by lower layers;
    2> else if the UE has radio link failure information or handover failure information available in VarRLF-Report of TS 36.331 [10] and if the RPLMN is included in plmn-IdentityList stored in VarRLF-Report of TS 36.331 [10]:
3> set timeSinceFailure in VarRLF-Report of TS 36.331 [10] to the time that elapsed since the last radio link or handover failure in EUTRA;
3> set the measResult-RLF-Report-EUTRA in the rlf-Report in the UEInformationResponse message to the value of rlf-Report in VarRLF-Report of TS 36.331 [10];
3> discard the rlf-Report from VarRLF-Report of TS 36.331 [10] upon successful delivery of the UEInformationResponse message confirmed by lower layers;
. . .
* End proposed text for 3GPP TS 38.331 *

These embodiments are further illustrated by FIG. 15, which shows an exemplary ASN.1 data structure for a UEInformationResponse message in which the nr-RLF-Report-r16 IE includes an optional rlf-InfoAvailable-r17 field that (if included) indicates availability of an RLF report.

In some embodiments, the UE can apply various reporting priority rules when it has stored multiple RLF reports associated with different RATs. For example, the UE can first indicate availability of RLF reports associated with the RAT where it is currently connected (e.g., NR RLF reports if currently connected to an NR cell) then later indicate availability of RLF reports associated with other RATs. Optionally, if a UE is not capable of cross-RAT RLF reporting, it does not indicate availability of RLF reports associated with the other RATs. As another example, the UE can indicate availability of stored RLF reports (e.g., for a particular RAT or for all RATs) in the chronological order in which they were stored/logged by the UE, starting with the earliest stored RLF report.

Upon receiving such availability indication(s), the network may request (e.g., in UEInformationRequest) one or more RLF reports indicated as available. For example, the network can indicate the RAT associated with the RLF report(s) that it is interested in receiving. As a more specific example, the network can indicate that it is interested to receive available NR-related RLF reports, in which case the UE will only send (e.g., in UEInformationResponse) an available NR-related RLF report together with an indication of availability of any further NR-related RLF reports, even if the UE has LTE-related RLF reports available.

In some embodiments, the UE sends an indication (e.g., dualRlfReportAvailable) of the availability of two or more RLF reports, e.g., in RRCReestablishmentComplete, RRCReconfigurationComplete, RRCResumeComplete or RRCSetupComplete messages as discussed above. For example, the UE includes a legacy indication (e.g., rlf-InfoAvailable) to indicate availability of one RLF report and the new indication dualRlfReportAvailable, to indicate availability of the two or more RLF reports, which may be associated with same or different RATs.

These embodiments are further illustrated by FIG. 16A, which shows an exemplary ASN.1 data structure for a RRCReestablishmentComplete message that can sent by a UE, with an optional rlf-InfoAvailable-r16 field that (if included) indicates availability of an RLF report and an optional dualRlfReportAvailable-r17 field that (if included) indicates availability of two or more RLF reports.

Similarly, the network can request (e.g., in UEInformationRequest) a single RLF report associated with a particular RAT by using a RAT-specific request parameter (e.g., nrRlf-ReportReq for NR or lteRlf-ReportReq for LTE) or RLF reports associated with both RATs (e.g., NR and LTE) by using a parameter such as bothRlf-ReportReq. If the UEInformationRequest message includes nrRlf-ReportReq, then the UE includes the available NR-related RLF report in the UEInformationResponse message. If the UEInformationRequest message includes lteRlf-ReportReq, then the UE includes the available LTE-related RLF report in the UEInformationResponse message. Likewise, if the UEInformationRequest message includes bothRlf-ReportReq, then the UE includes both available RLF reports in the UEInformationResponse message.

These embodiments are further illustrated by FIG. 16B, which shows an exemplary ASN.1 data structure for a UEInformationRequest message that can sent by a network, with optional nrRlf-ReportReq-r17, lteRlf-ReportReq-r17, and bothRlf-ReportReq-r17 fields as discussed above.

In some embodiments, existing mechanisms can be used by RAN nodes to forward RLF reports received from UEs to other RAN nodes. For example, a FAILURE INDICATION message can be used to signal an RLF report between NG-RAN nodes over the Xn interface. Likewise, an UL RAN CONFIGURATION TRANSFER message can be used to signal an RLF report from an NG-RAN node to an E-UTRAN node over the NG interface.

However, these existing mechanisms require that a forwarded RLF report conform to a specific format associated with a specific RAT. In some embodiments, to maintain network compatibility, a RAN node receiving multiple RLF Reports from a UE can segment and/or divided them into individual RLF reports, where each RLF report is encoded in conformance with the RAT with which it is associated. For example, if concatenated NR and LTE RLF reports are received by a RAN node from a UE according to any of the techniques discussed above, the RAN node can encode them as two separate reports—one encoded according to NR RRC specifications and the other encoded according to NR RRC specifications. Once these reports are separately available, the RAN node can forward them to target RAN nodes that can take their content into account for configuration and procedures optimization.

Figure 17:
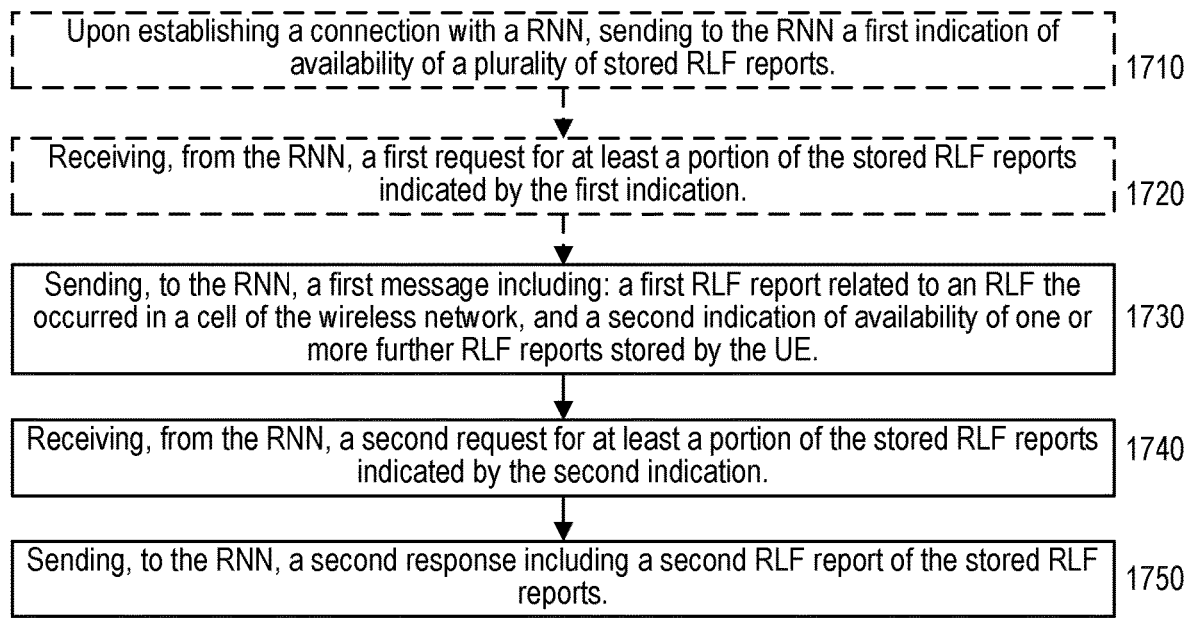
FIG. 17 is a flow diagram of an exemplary method (e.g., procedure) for a UE (e.g., wireless device, IoT device, etc. or component(s) thereof), according to various embodiments of the present disclosure.
Figure 18:
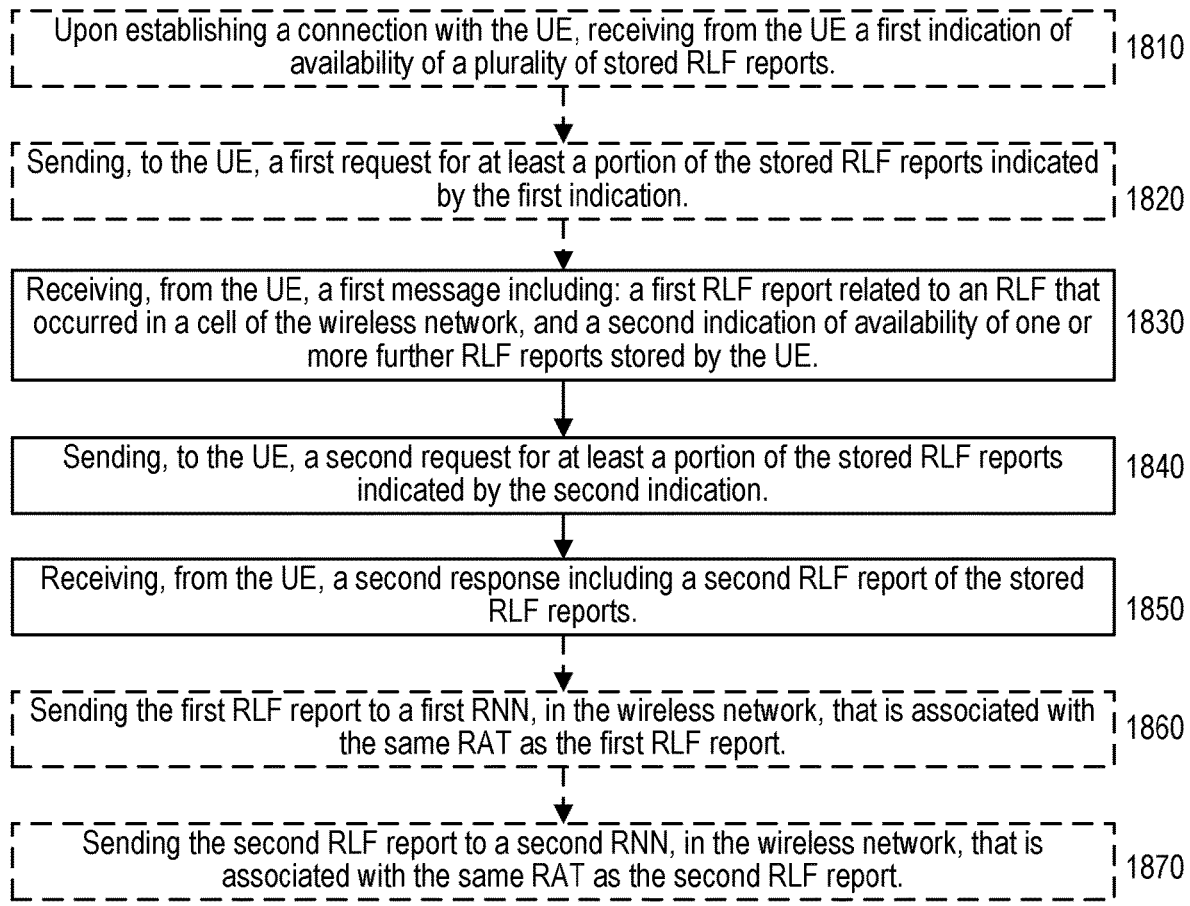
FIG. 18 is a flow diagram of an exemplary method (e.g., procedure) for a radio network node (RNN, e.g., eNB, gNB, ng-eNB, en-gNB, etc. or component(s) thereof), according to various embodiments of the present disclosure.

The embodiments described above can be further illustrated with reference to FIGS. 17-18, which show exemplary methods (e.g., procedures) for a UE and a radio network node (RNN), respectively. In other words, various features of operations described below correspond to various embodiments described above. These exemplary methods can be used cooperatively to provide various exemplary benefits and/or advantages. Although FIGS. 17-18 show specific blocks in a particular order, the operations of the respective methods can be performed in different orders than shown and can be combined and/or divided into blocks having different functionality than shown. Optional blocks or operations are indicated by dashed lines.

In particular, FIG. 17 shows a flow diagram of an exemplary method (e.g., procedure) for a UE to report RLF in a wireless network, according to various embodiments of the present disclosure. The exemplary method can be performed by a UE (e.g., wireless device, IoT device, modem, etc. or component thereof) in communication with an RNN (e.g., base station, eNB, gNB, ng-eNB, en-gNB, etc., or component thereof) in the wireless network (e.g., E-UTRAN, NG-RAN).

The exemplary method can include operations of block 1730, where the UE can send, to an RNN in the wireless network, a first message including: a first RLF report related to an RLF that occurred in a cell of the wireless network, and a second indication of availability of one or more further RLF reports stored by the UE. Examples are illustrated by FIGS. 14A-B and 15. In some embodiments, the second indication of availability can be included in the first RLF report, as illustrated by FIG. 15. In some embodiments, the first message can be a UEInformationResponse message.

The exemplary method can also include operations of block 1740, where the UE can receive, from the RNN, a second request for at least a portion of the stored RLF reports indicated by the second indication. In some embodiments, the second request can be received in a UEInformationRequest message.

The exemplary method can also include operations of block 1750, where the UE can send, to the RNN, a second response including a second RLF report of the stored RLF reports. In some embodiments, the second response including the second RLF report can be a UEInformationResponse message. In some embodiments, the second response can also include a third indication of availability of a third RLF report of the stored RLF reports.

In some embodiments, the second indication also indicates respective radio access technology (RATs) associated with the one or more further RLF reports stored by the UE. In some embodiments, the second indication can comprise a first type of indication (e.g., legacy indication) when indicating availability of a single further RLF report stored by the UE, or a second type of indication (e.g., new indication) when indicating availability of a plurality of further RLF reports stored by the UE.

In some embodiments, the first and second RLF reports can be associated with different RATs, such as LTE and NR. In some of these embodiments, the exemplary method can also include the operations of blocks 1710-1720. In block 1710, the UE can, upon establishing a connection with a cell served by the RNN, send to the RNN a first indication of availability of a plurality of stored RLF reports. In some embodiments, the first indication can be sent in one of the following messages: RRCReconfigurationComplete, RRCResumeComplete, RRCSetupComplete, or RRCReestablishmentComplete.

In block 1720, the UE can receive, from the RNN, a first request for at least a portion of the stored RLF reports indicated by the first indication. For example, the first request can be a UEInformationRequest message. In such embodiments, the first message can be sent (e.g., in block 1730) in response to the first request (e.g., in block 1720).

In some variants, the first indication can indicate that the stored RLF reports are associated with the plurality of different RATs, as illustrated in FIG. 16A. In such variants, the first request can indicate a particular one or more of the different RATs for which stored RLF reports are requested, as illustrated by FIG. 16B. In some further variants, the first request indicates first and second RATs (e.g., NR and LTE) for which stored RLF reports are requested. In such case, the first RLF report can be associated with the first RAT and the first message (e.g., sent in block 1730) can also include a further first RLF report associated with the second RAT.

In other variants, the first indication indicates availability of only the stored RLF reports that are associated with a single RAT, and the first message includes a plurality of RLF reports associated with the single RAT. In some further variants, the single RAT is a RAT used for the connection with the RNN. In some further variants, the second indication (i.e., in the first message) indicates availability of the stored RLF reports that are associated with RATs other than the RAT used for the connection with the RNN. For example, if LTE is used for the connection with the RNN, the first message includes a plurality of RLF reports associated with LTE and an indication of availability of stored RLF reports associated with NR.

In other variants, the second indication (i.e., in the first message) indicates availability of one or more stored RLF reports related to respective one or more RLFs that occurred after an RLF related to the first RLF report.

In addition, FIG. 18 shows a flow diagram of an exemplary method (e.g., procedure) to receive RLF reports from UEs in a wireless network, according to various embodiments of the present disclosure. The exemplary method can be performed by an RNN (e.g., base station, eNB, gNB, ng-eNB, en-gNB, etc., or components thereof) in the wireless network (e.g., E-UTRAN, NG-RAN).

The exemplary method can include operations of block 1830, where the RNN can receive, from a UE, a first message including: a first RLF report related to an RLF that occurred in a cell of the wireless network, and a second indication of availability of one or more further RLF reports stored by the UE. Examples are illustrated by FIGS. 14A-B and 15. In some embodiments, the second indication of availability can be included in the first RLF report, as illustrated by FIG. 15. In some embodiments, the first message can be a UEInformationResponse message.

The exemplary method can also include operations of block 1840, where the RNN can send, to the UE, a second request for at least a portion of the stored RLF reports indicated by the second indication. In some embodiments, the second request can be sent in a UEInformationRequest message.

The exemplary method can also include operations of block 1850, where the RNN can receive, from the UE, a second response including a second RLF report of the stored RLF reports. In some embodiments, the second response including the second RLF report can be a UEInformationResponse message. In some embodiments, the second response can also include a third indication of availability of a third RLF report of the stored RLF reports.

In some embodiments, the second indication also indicates respective RATs associated with the one or more further RLF reports stored by the UE. In some embodiments, the second indication can comprise a first type of indication (e.g., legacy indication) when indicating availability of a single further RLF report stored by the UE, or a second type of indication (e.g., new indication) when indicating availability of a plurality of further RLF reports stored by the UE.

In some embodiments, the first and second RLF reports can be associated with different RATs, such as LTE and NR. In some of these embodiments, the exemplary method can also include the operations of blocks 1860-1870. In block 1860, the RNN can send the first RLF report to a first RNN, in the wireless network, that is associated with the same RAT as the first RLF report. In block 1870, the RNN can send the second RLF report to a second RNN, in the wireless network, that is associated with the same RAT as the second RLF report. In some variants, the first RLF report can be sent in a first inter-node message (e.g., FAILURE INDICATION) via a first inter-node interface (e.g., Xn), while the second RLF report can be sent in a second inter-node message (e.g., UL RAN CONFIGURATION TRANSFER) via a second inter-node interface (e.g., NG).

In some of these embodiments, the exemplary method can also include the operations of blocks 1810-1820. In block 1810, the RNN can, upon establishing a connection with the UE, receive from the UE a first indication of availability of a plurality of stored RLF reports. In some embodiments, the first indication can be received in one of the following messages: RRCReconfigurationComplete, RRCResumeComplete, RRCSetupComplete, or RRCReestablishmentComplete.

In block 1820, the RNN can send, to the UE, a first request for at least a portion of the stored RLF reports indicated by the first indication. For example, the first request can be a UEInformationRequest message. In such embodiments, the first message can be received (e.g., in block 1830) in response to the first request (e.g., in block 1820).

In some variants, the first indication can indicate that the stored RLF reports are associated with a plurality of different RATs, as illustrated in FIG. 16A. In such variants, the first request can indicate a particular one or more of the different RATs for which stored RLF reports are requested, as illustrated by FIG. 16B. In some further variants, the first request indicates first and second RATs (e.g., NR and LTE) for which stored RLF reports are requested. In such case, the first RLF report can be associated with the first RAT and the first message (e.g., received in block 1830) can also include a further first RLF report associated with the second RAT.

In other variants, the first indication can indicate availability of only the stored RLF reports that are associated with a single RAT, and the first message includes a plurality of RLF reports associated with the single RAT. In some variants, the single RAT is a RAT used for the connection with the RNN. In some further variants, the second indication (i.e., in the first message) indicates availability of the stored RLF reports that are associated with RATs other than the RAT used for the connection with the RNN. For example, if LTE is used for the connection with the RNN, the first message includes a plurality of RLF reports associated with LTE and an indication of availability of stored RLF reports associated with NR.

In other variants, the second indication (i.e., in the first message) indicates availability of one or more stored RLF reports related to respective one or more RLFs that occurred after an RLF related to the first RLF report.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 19:
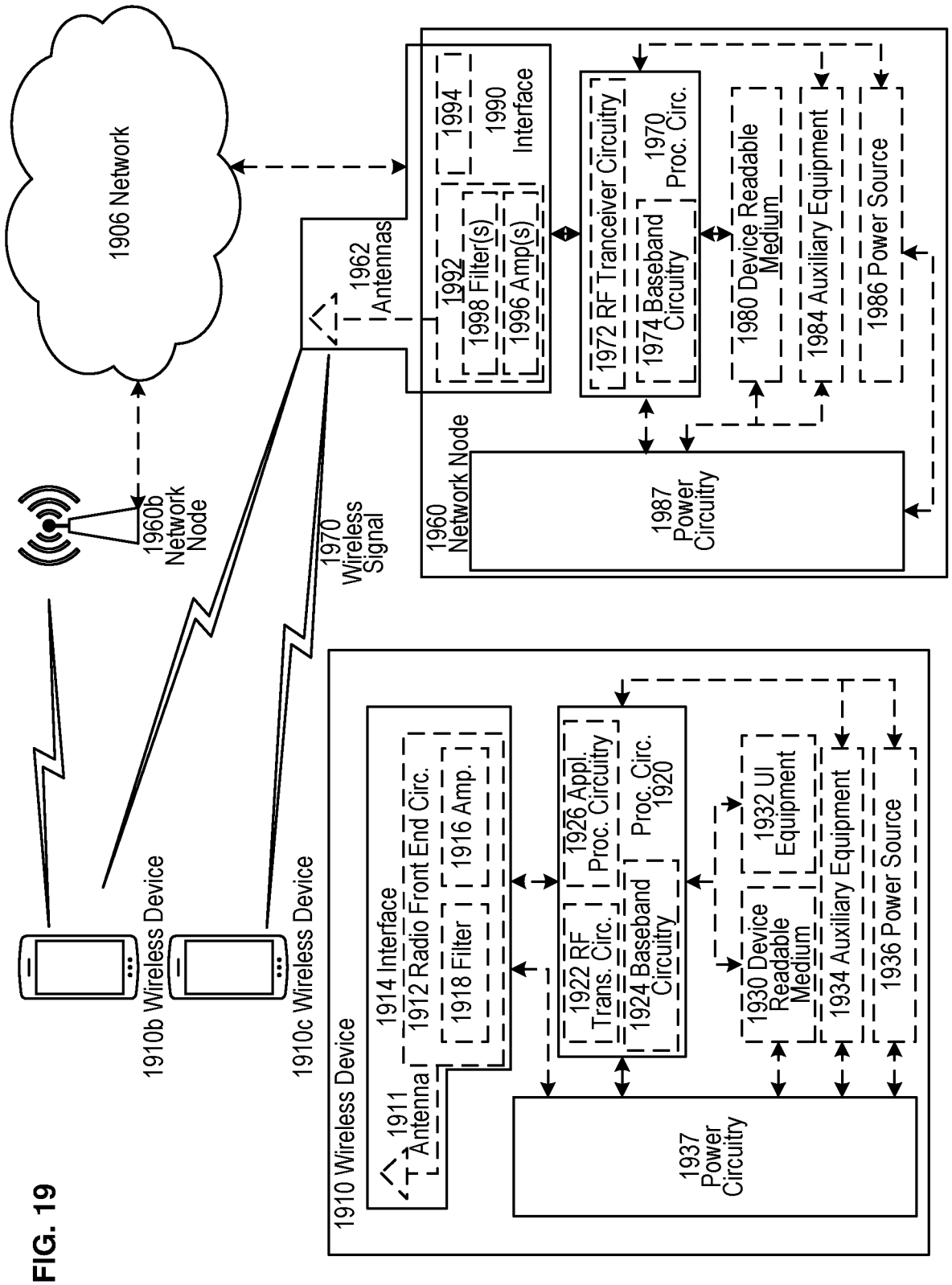
FIG. 19 illustrates an exemplary embodiment of a wireless network.

For example, FIG. 19 shows an exemplary wireless network in which various embodiments disclosed herein can be implemented. For simplicity, the wireless network of FIG. 19 only depicts network 1906, network nodes 1960 and 1960*b*, and WDs 1910, 1910*b*, and 1910*c*. In practice, a wireless network can further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1960 are depicted as single boxes located within a larger box, or nested within multiple boxes, in practice, a network node can comprise multiple different physical components that make up a single illustrated component (e.g., device readable medium 1980 can comprise multiple separate hard drives as well as multiple RAM modules).

Similarly, network node 1960 can be composed of multiple physically separate components (e.g., a NodeB component and an RNC component, or a BTS component and a BSC component, etc.), which can each have their own respective components. In certain scenarios in which network node 1960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1960 can be configured to support multiple radio access technologies (RATs). In such embodiments, some components can be duplicated (e.g., separate device readable medium 1980 for the different RATs) and some components can be reused (e.g., the same antenna 1962 can be shared by the RATs). Network node 1960 can also include multiple sets of the various illustrated components for different wireless technologies integrated into network node 1960, such as, for example, GSM, WCDMA, LTE, NR, WiFi, or Bluetooth wireless technologies. These wireless technologies can be integrated into the same or different chip or set of chips and other components within network node 1960.

Processing circuitry 1970 can be configured to perform any determining, calculating, or similar operations (e.g., certain obtaining operations) described herein as being provided by a network node. These operations performed by processing circuitry 1970 can include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1960, either alone or in conjunction with other network node 1960 components (e.g., device readable medium 1980). Such functionality can include any of the various wireless features, functions, or benefits discussed herein.

For example, processing circuitry 1970 can execute instructions stored in device readable medium 1980 or in memory within processing circuitry 1970. In some embodiments, processing circuitry 1970 can include a system on a chip (SOC). As a more specific example, instructions (also referred to as a computer program product) stored in medium 1980 can include instructions that, when executed by processing circuitry 1970, can configure network node 1960 to perform operations corresponding to various exemplary methods (e.g., procedures) described herein.

In some embodiments, processing circuitry 1970 can include one or more of radio frequency (RF) transceiver circuitry 1972 and baseband processing circuitry 1974. In some embodiments, radio frequency (RF) transceiver circuitry 1972 and baseband processing circuitry 1974 can be on separate chips (or sets of chips), boards, or units, such as radio units and digital units. In alternative embodiments, part or all of RF transceiver circuitry 1972 and baseband processing circuitry 1974 can be on the same chip or set of chips, boards, or units In certain embodiments, some or all of the functionality described herein as being provided by a network node, base station, eNB or other such network device can be performed by processing circuitry 1970 executing instructions stored on device readable medium 1980 or memory within processing circuitry 1970. In alternative embodiments, some or all of the functionality can be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960 but are enjoyed by network node 1960 as a whole, and/or by end users and the wireless network generally.

Device readable medium 1980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1970. Device readable medium 1980 can store any suitable instructions, data or information, including a computer program, software, an application including one or more of logic, rules, code, tables, etc. and/or other instructions capable of being executed by processing circuitry 1970 and, utilized by network node 1960. Device readable medium 1980 can be used to store any calculations made by processing circuitry 1970 and/or any data received via interface 1990. In some embodiments, processing circuitry 1970 and device readable medium 1980 can be considered to be integrated.

Interface 1990 is used in the wired or wireless communication of signaling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that can be coupled to, or in certain embodiments a part of, antenna 1962. Radio front end circuitry 1992 comprises filters 1998 and amplifiers 1996. Radio front end circuitry 1992 can be connected to antenna 1962 and processing circuitry 1970. Radio front end circuitry can be configured to condition signals communicated between antenna 1962 and processing circuitry 1970. Radio front end circuitry 1992 can receive digital data that is to be sent out to other network nodes or WDs via a wireless connection. Radio front end circuitry 1992 can convert the digital data into a radio signal having the appropriate channel and bandwidth parameters using a combination of filters 1998 and/or amplifiers 1996. The radio signal can then be transmitted via antenna 1962. Similarly, when receiving data, antenna 1962 can collect radio signals which are then converted into digital data by radio front end circuitry 1992. The digital data can be passed to processing circuitry 1970. In other embodiments, the interface can comprise different components and/or different combinations of components.

In certain alternative embodiments, network node 1960 may not include separate radio front end circuitry 1992, instead, processing circuitry 1970 can comprise radio front end circuitry and can be connected to antenna 1962 without separate radio front end circuitry 1992. Similarly, in some embodiments, all or some of RF transceiver circuitry 1972 can be considered a part of interface 1990. In still other embodiments, interface 1990 can include one or more ports or terminals 1994, radio front end circuitry 1992, and RF transceiver circuitry 1972, as part of a radio unit (not shown), and interface 1990 can communicate with baseband processing circuitry 1974, which is part of a digital unit (not shown).

Antenna 1962 can include one or more antennas, or antenna arrays, configured to send and/or receive wireless signals. Antenna 1962 can be coupled to radio front end circuitry 1990 and can be any type of antenna capable of transmitting and receiving data and/or signals wirelessly. In some embodiments, antenna 1962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1962 can be separate from network node 1960 and can be connectable to network node 1960 through an interface or port.

Antenna 1962, interface 1990, and/or processing circuitry 1970 can be configured to perform any receiving operations and/or certain obtaining operations described herein as being performed by a network node. Any information, data and/or signals can be received from a wireless device, another network node and/or any other network equipment. Similarly, antenna 1962, interface 1990, and/or processing circuitry 1970 can be configured to perform any transmitting operations described herein as being performed by a network node. Any information, data and/or signals can be transmitted to a wireless device, another network node and/or any other network equipment.

Power circuitry 1987 can comprise, or be coupled to, power management circuitry and can be configured to supply the components of network node 1960 with power for performing the functionality described herein. Power circuitry 1987 can receive power from power source 1986. Power source 1986 and/or power circuitry 1987 can be configured to provide power to the various components of network node 1960 in a form suitable for the respective components (e.g., at a voltage and current level needed for each respective component). Power source 1986 can either be included in, or external to, power circuitry 1987 and/or network node 1960. For example, network node 1960 can be connectable to an external power source (e.g., an electricity outlet) via an input circuitry or interface such as an electrical cable, whereby the external power source supplies power to power circuitry 1987. As a further example, power source 1986 can comprise a source of power in the form of a battery or battery pack which is connected to, or integrated in, power circuitry 1987. The battery can provide backup power should the external power source fail. Other types of power sources, such as photovoltaic devices, can also be used.

Alternative embodiments of network node 1960 can include additional components beyond those shown in FIG. 19 that can be responsible for providing certain aspects of the network node's functionality, including any of the functionality described herein and/or any functionality necessary to support the subject matter described herein. For example, network node 1960 can include user interface equipment to allow and/or facilitate input of information into network node 1960 and to allow and/or facilitate output of information from network node 1960. This can allow and/or facilitate a user to perform diagnostic, maintenance, repair, and other administrative functions for network node 1960.

In some embodiments, a wireless device (WD, e.g., WD 1910) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 can include multiple sets of one or more of the illustrated components for different wireless technologies supported by WD 1910, such as, for example, GSM, WCDMA, LTE, NR, WiFi, WiMAX, or Bluetooth wireless technologies, just to mention a few. These wireless technologies can be integrated into the same or different chips or set of chips as other components within WD 1910.

Antenna 1911 can include one or more antennas or antenna arrays, configured to send and/or receive wireless signals, and is connected to interface 1914. In certain alternative embodiments, antenna 1911 can be separate from WD 1910 and be connectable to WD 1910 through an interface or port. Antenna 1911, interface 1914, and/or processing circuitry 1920 can be configured to perform any receiving or transmitting operations described herein as being performed by a WD. Any information, data and/or signals can be received from a network node and/or another WD. In some embodiments, radio front end circuitry and/or antenna 1911 can be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920 and can be configured to condition signals communicated between antenna 1911 and processing circuitry 1920. Radio front end circuitry 1912 can be coupled to or a part of antenna 1911. In some embodiments, WD 1910 may not include separate radio front end circuitry 1912; rather, processing circuitry 1920 can comprise radio front end circuitry and can be connected to antenna 1911. Similarly, in some embodiments, some or all of RF transceiver circuitry 1922 can be considered a part of interface 1914. Radio front end circuitry 1912 can receive digital data that is to be sent out to other network nodes or WDs via a wireless connection. Radio front end circuitry 1912 can convert the digital data into a radio signal having the appropriate channel and bandwidth parameters using a combination of filters 1918 and/or amplifiers 1916. The radio signal can then be transmitted via antenna 1911. Similarly, when receiving data, antenna 1911 can collect radio signals which are then converted into digital data by radio front end circuitry 1912. The digital data can be passed to processing circuitry 1920. In other embodiments, the interface can comprise different components and/or different combinations of components.

Processing circuitry 1920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1910 functionality either alone or in combination with other WD 1910 components, such as device readable medium 1930. Such functionality can include any of the various wireless features or benefits discussed herein.

For example, processing circuitry 1920 can execute instructions stored in device readable medium 1930 or in memory within processing circuitry 1920 to provide the functionality disclosed herein. More specifically, instructions (also referred to as a computer program product) stored in medium 1930 can include instructions that, when executed by processor 1920, can configure wireless device 1910 to perform operations corresponding to various exemplary methods (e.g., procedures) described herein.

As illustrated, processing circuitry 1920 includes one or more of RF transceiver circuitry 1922, baseband processing circuitry 1924, and application processing circuitry 1926. In other embodiments, the processing circuitry can comprise different components and/or different combinations of components. In certain embodiments processing circuitry 1920 of WD 1910 can comprise a SOC. In some embodiments, RF transceiver circuitry 1922, baseband processing circuitry 1924, and application processing circuitry 1926 can be on separate chips or sets of chips. In alternative embodiments, part or all of baseband processing circuitry 1924 and application processing circuitry 1926 can be combined into one chip or set of chips, and RF transceiver circuitry 1922 can be on a separate chip or set of chips. In still alternative embodiments, part or all of RF transceiver circuitry 1922 and baseband processing circuitry 1924 can be on the same chip or set of chips, and application processing circuitry 1926 can be on a separate chip or set of chips. In yet other alternative embodiments, part or all of RF transceiver circuitry 1922, baseband processing circuitry 1924, and application processing circuitry 1926 can be combined in the same chip or set of chips. In some embodiments, RF transceiver circuitry 1922 can be a part of interface 1914. RF transceiver circuitry 1922 can condition RF signals for processing circuitry 1920.

In certain embodiments, some or all of the functionality described herein as being performed by a WD can be provided by processing circuitry 1920 executing instructions stored on device readable medium 1930, which in certain embodiments can be a computer-readable storage medium. In alternative embodiments, some or all of the functionality can be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 can be configured to perform any determining, calculating, or similar operations (e.g., certain obtaining operations) described herein as being performed by a WD. These operations, as performed by processing circuitry 1920, can include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 can be operable to store a computer program, software, an application including one or more of logic, rules, code, tables, etc. and/or other instructions capable of being executed by processing circuitry 1920. Device readable medium 1930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device to readable and/or computer executable memory devices that store information, data, and/or instructions that can be used by processing circuitry 1920. In some embodiments, processing circuitry 1920 and device readable medium 1930 can be considered to be integrated.

User interface equipment 1932 can include components that allow and/or facilitate a human user to interact with WD 1910. Such interaction can be of many forms, such as visual, audial, tactile, etc. User interface equipment 1932 can be operable to produce output to the user and to allow and/or facilitate the user to provide input to WD 1910. The type of interaction can vary depending on the type of user interface equipment 1932 installed in WD 1910. For example, if WD 1910 is a smart phone, the interaction can be via a touch screen; if WD 1910 is a smart meter, the interaction can be through a screen that provides usage (e.g., the number of gallons used) or a speaker that provides an audible alert (e.g., if smoke is detected). User interface equipment 1932 can include input interfaces, devices and circuits, and output interfaces, devices and circuits. User interface equipment 1932 can be configured to allow and/or facilitate input of information into WD 1910 and is connected to processing circuitry 1920 to allow and/or facilitate processing circuitry 1920 to process the input information. User interface equipment 1932 can include, for example, a microphone, a proximity or other sensor, keys/buttons, a touch display, one or more cameras, a USB port, or other input circuitry. User interface equipment 1932 is also configured to allow and/or facilitate output of information from WD 1910, and to allow and/or facilitate processing circuitry 1920 to output information from WD 1910. User interface equipment 1932 can include, for example, a speaker, a display, vibrating circuitry, a USB port, a headphone interface, or other output circuitry. Using one or more input and output interfaces, devices, and circuits, of user interface equipment 1932, WD 1910 can communicate with end users and/or the wireless network and allow and/or facilitate them to benefit from the functionality described herein.

Auxiliary equipment 1934 is operable to provide more specific functionality which may not be generally performed by WDs. This can comprise specialized sensors for doing measurements for various purposes, interfaces for additional types of communication such as wired communications etc. The inclusion and type of components of auxiliary equipment 1934 can vary depending on the embodiment and/or scenario.

Power source 1936 can, in some embodiments, be in the form of a battery or battery pack. Other types of power sources, such as an external power source (e.g., an electricity outlet), photovoltaic devices or power cells, can also be used. WD 1910 can further comprise power circuitry 1937 for delivering power from power source 1936 to the various parts of WD 1910 which need power from power source 1936 to carry out any functionality described or indicated herein. Power circuitry 1937 can in certain embodiments comprise power management circuitry. Power circuitry 1937 can additionally or alternatively be operable to receive power from an external power source; in which case WD 1910 can be connectable to the external power source (such as an electricity outlet) via input circuitry or an interface such as an electrical power cable. Power circuitry 1937 can also in certain embodiments be operable to deliver power from an external power source to power source 1936. This can be, for example, for the charging of power source 1936. Power circuitry 1937 can perform any converting or other modification to the power from power source 1936 to make it suitable for supply to the respective components of WD 1910.

Figure 20:
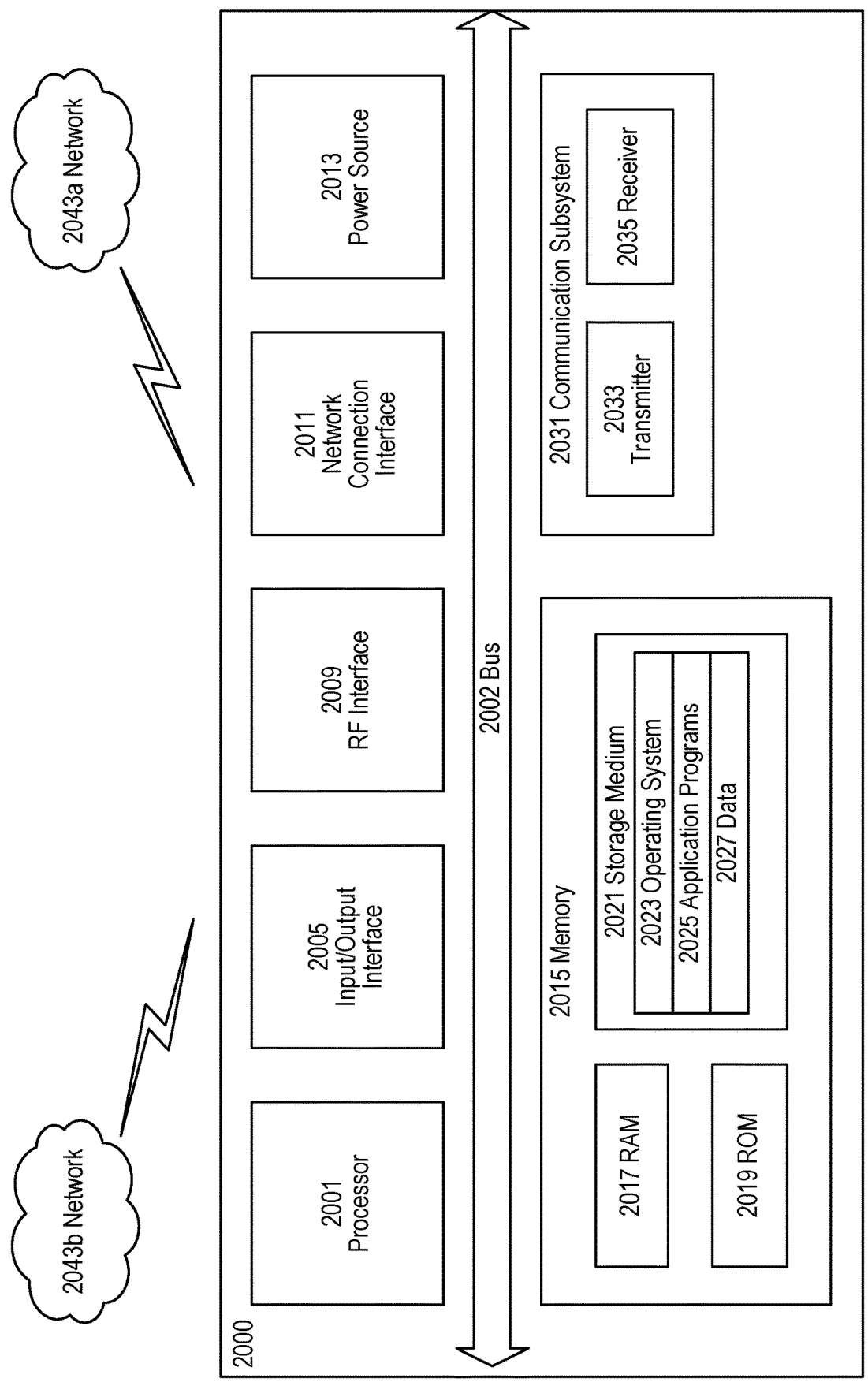
FIG. 20 illustrates an exemplary embodiment of a UE.

FIG. 20 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 20230 can be any UE identified by the 3rd Generation Partnership Project (3GPP), including a NB-IoT UE, a machine type communication (MTC) UE, and/or an enhanced MTC (eMTC) UE. UE 2000, as illustrated in FIG. 20, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 can include other similar types of information. Certain UEs can utilize all of the components shown in FIG. 20, or only a subset of the components. The level of integration between the components can vary from one UE to another UE. Further, certain UEs can contain multiple instances of a component, such as multiple processors, memories, transceivers, transmitters, receivers, etc.

In FIG. 20, processing circuitry 2001 can be configured to process computer instructions and data. Processing circuitry 2001 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 can include two central processing units (CPUs). Data can be information in a form suitable for use by a computer.

In the depicted embodiment, input/output interface 2005 can be configured to provide a communication interface to an input device, output device, or input and output device. UE 2000 can be configured to use an output device via input/output interface 2005. An output device can use the same type of interface port as an input device. For example, a USB port can be used to provide input to and output from UE 2000. The output device can be a speaker, a sound card, a video card, a display, a monitor, a printer, an actuator, an emitter, a smartcard, another output device, or any combination thereof. UE 2000 can be configured to use an input device via input/output interface 2005 to allow and/or facilitate a user to capture information into UE 2000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 20, RF interface 2009 can be configured to provide a communication interface to RF components such as a transmitter, a receiver, and an antenna. Network connection interface 2011 can be configured to provide a communication interface to network 2043a. Network 2043a can encompass wired and/or wireless networks such as a local-area network (LAN), a wide-area network (WAN), a computer network, a wireless network, a telecommunications network, another like network or any combination thereof. For example, network 2043a can comprise a Wi-Fi network. Network connection interface 2011 can be configured to include a receiver and a transmitter interface used to communicate with one or more other devices over a communication network according to one or more communication protocols, such as Ethernet, TCP/IP, SONET, ATM, or the like. Network connection interface 2011 can implement receiver and transmitter functionality appropriate to the communication network links (e.g., optical, electrical, and the like). The transmitter and receiver functions can share circuit components, software or firmware, or alternatively can be implemented separately.

RAM 2017 can be configured to interface via bus 2002 to processing circuitry 2001 to provide storage or caching of data or computer instructions during the execution of software programs such as the operating system, application programs, and device drivers. ROM 2019 can be configured to provide computer instructions or data to processing circuitry 2001. For example, ROM 2019 can be configured to store invariant low-level system code or data for basic system functions such as basic input and output (I/O), startup, or reception of keystrokes from a keyboard that are stored in a non-volatile memory. Storage medium 2021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2021 can be configured to include operating system 2023; application program 2025 such as a web browser application, a widget or gadget engine or another application; and data file 2027. Storage medium 2021 can store, for use by UE 2000, any of a variety of various operating systems or combinations of operating systems. For example, application program 2025 can include executable program instructions (also referred to as a computer program product) that, when executed by processor 2001, can configure UE 2000 to perform operations corresponding to various exemplary methods (e.g., procedures) described herein.

Storage medium 2021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 can allow and/or facilitate UE 2000 to access computer-executable instructions, application programs or the like, stored on transitory or non-transitory memory media, to off-load data, or to upload data. An article of manufacture, such as one utilizing a communication system can be tangibly embodied in storage medium 2021, which can comprise a device readable medium.

In FIG. 20, processing circuitry 2001 can be configured to communicate with network 2043b using communication subsystem 2031. Network 2043a and network 2043b can be the same network or networks or different network or networks. Communication subsystem 2031 can be configured to include one or more transceivers used to communicate with network 2043b. For example, communication subsystem 2031 can be configured to include one or more transceivers used to communicate with one or more remote transceivers of another device capable of wireless communication such as another WD, UE, or base station of a radio access network (RAN) according to one or more communication protocols, such as IEEE 802.20, CDMA, WCDMA, GSM, LTE, UTRAN, WiMax, or the like. Each transceiver can include transmitter 2033 and/or receiver 2035 to implement transmitter or receiver functionality, respectively, appropriate to the RAN links (e.g., frequency allocations and the like). Further, transmitter 2033 and receiver 2035 of each transceiver can share circuit components, software or firmware, or alternatively can be implemented separately.

In the illustrated embodiment, the communication functions of communication subsystem 2031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 can include cellular communication, Wi-Fi communication, Bluetooth communication, and GPS communication. Network 2043b can encompass wired and/or wireless networks such as a local-area network (LAN), a wide-area network (WAN), a computer network, a wireless network, a telecommunications network, another like network or any combination thereof. For example, network 2043b can be a cellular network, a Wi-Fi network, and/or a near-field network. Power source 2013 can be configured to provide alternating current (AC) or direct current (DC) power to components of UE 2000.

The features, benefits and/or functions described herein can be implemented in one of the components of UE 2000 or partitioned across multiple components of UE 2000. Further, the features, benefits, and/or functions described herein can be implemented in any combination of hardware, software or firmware. In one example, communication subsystem 2031 can be configured to include any of the components described herein. Further, processing circuitry 2001 can be configured to communicate with any of such components over bus 2002. In another example, any of such components can be represented by program instructions stored in memory that when executed by processing circuitry 2001 perform the corresponding functions described herein. In another example, the functionality of any of such components can be partitioned between processing circuitry 2001 and communication subsystem 2031. In another example, the non-computationally intensive functions of any of such components can be implemented in software or firmware and the computationally intensive functions can be implemented in hardware.

Figure 21:
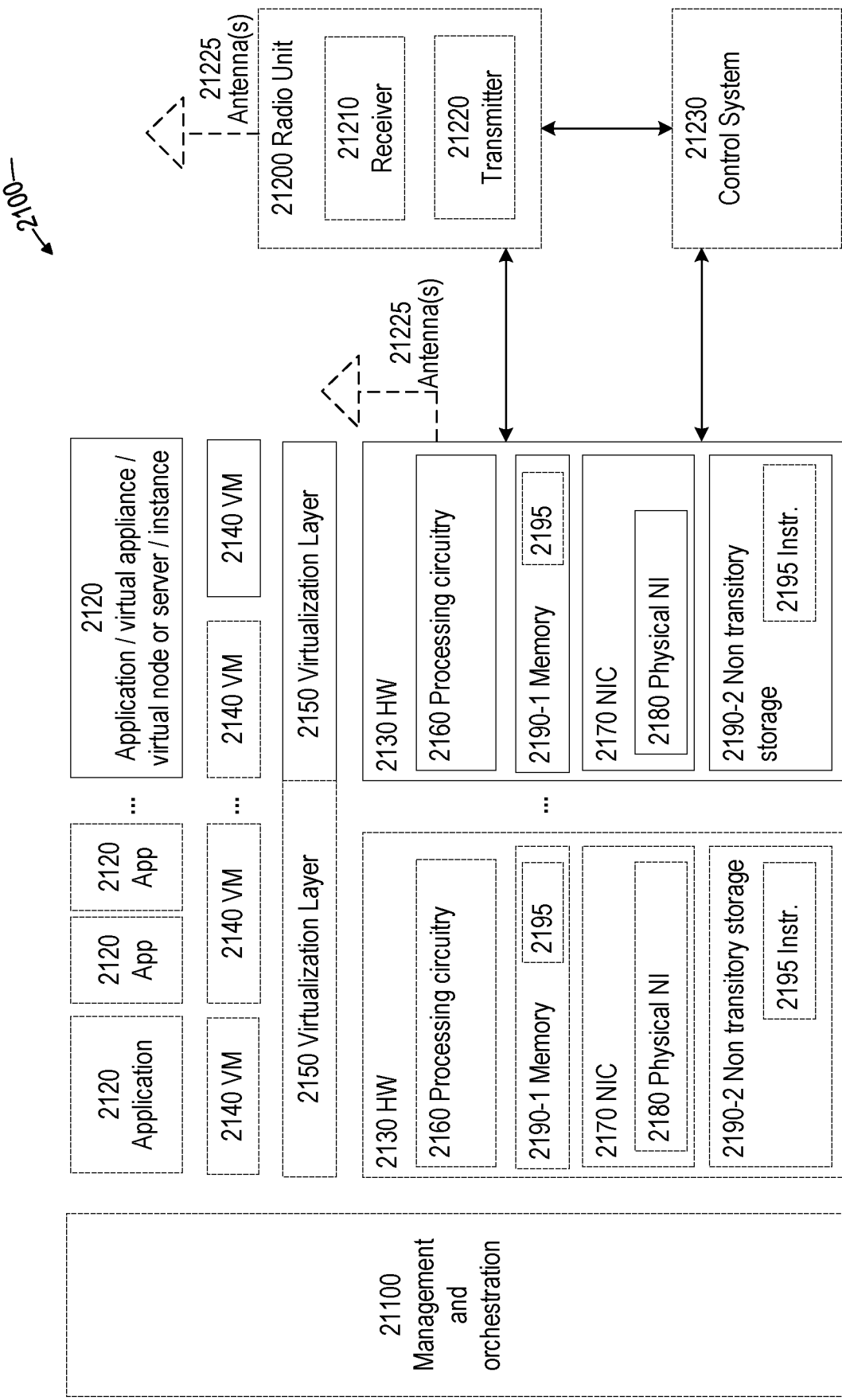
FIG. 21 is a block diagram illustrating an exemplary virtualization environment usable for implementation of various embodiments of network nodes in a wireless network.

FIG. 21 is a schematic block diagram illustrating a virtualization environment 2100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node can be entirely virtualized.

The functions can be implemented by one or more applications 2120 (which can alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100 can include general-purpose or special-purpose network hardware devices (or nodes) 2130 comprising a set of one or more processors or processing circuitry 2160, which can be commercial off-the-shelf (COTS) processors, dedicated Application Specific Integrated Circuits (ASICs), or any other type of processing circuitry including digital or analog hardware components or special purpose processors. Each hardware device can comprise memory 2190-1 which can be non-persistent memory for temporarily storing instructions 2195 or software executed by processing circuitry 2160. For example, instructions 2195 can include program instructions (also referred to as a computer program product) that, when executed by processing circuitry 2160, can configure hardware node 2120 to perform operations corresponding to various exemplary methods (e.g., procedures) described herein. Such operations can also be attributed to virtual node(s) 2120 that is/are hosted by hardware node 2130.

Each hardware device can comprise one or more network interface controllers (NICs) 2170, also known as network interface cards, which include physical network interface 2180. Each hardware device can also include non-transitory, persistent, machine-readable storage media 2190-2 having stored therein software 2195 and/or instructions executable by processing circuitry 2160. Software 2195 can include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and can be run by a corresponding virtualization layer 2150 or hypervisor. Different embodiments of the instance of virtual appliance 2120 can be implemented on one or more of virtual machines 2140, and the implementations can be made in different ways.

During operation, processing circuitry 2160 executes software 2195 to instantiate the hypervisor or virtualization layer 2150, which can sometimes be referred to as a virtual machine monitor (VMM). Virtualization layer 2150 can present a virtual operating platform that appears like networking hardware to virtual machine 2140.

As shown in FIG. 21, hardware 2130 can be a standalone network node with generic or specific components. Hardware 2130 can comprise antenna 21225 and can implement some functions via virtualization. Alternatively, hardware 2130 can be part of a larger cluster of hardware (e.g., such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 2140 can be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 can be coupled to one or more antennas 21225. Radio units 21200 can communicate directly with hardware nodes 2130 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 21230, which can alternatively be used for communication between the hardware nodes 2130 and radio units 21200.

Figure 22:
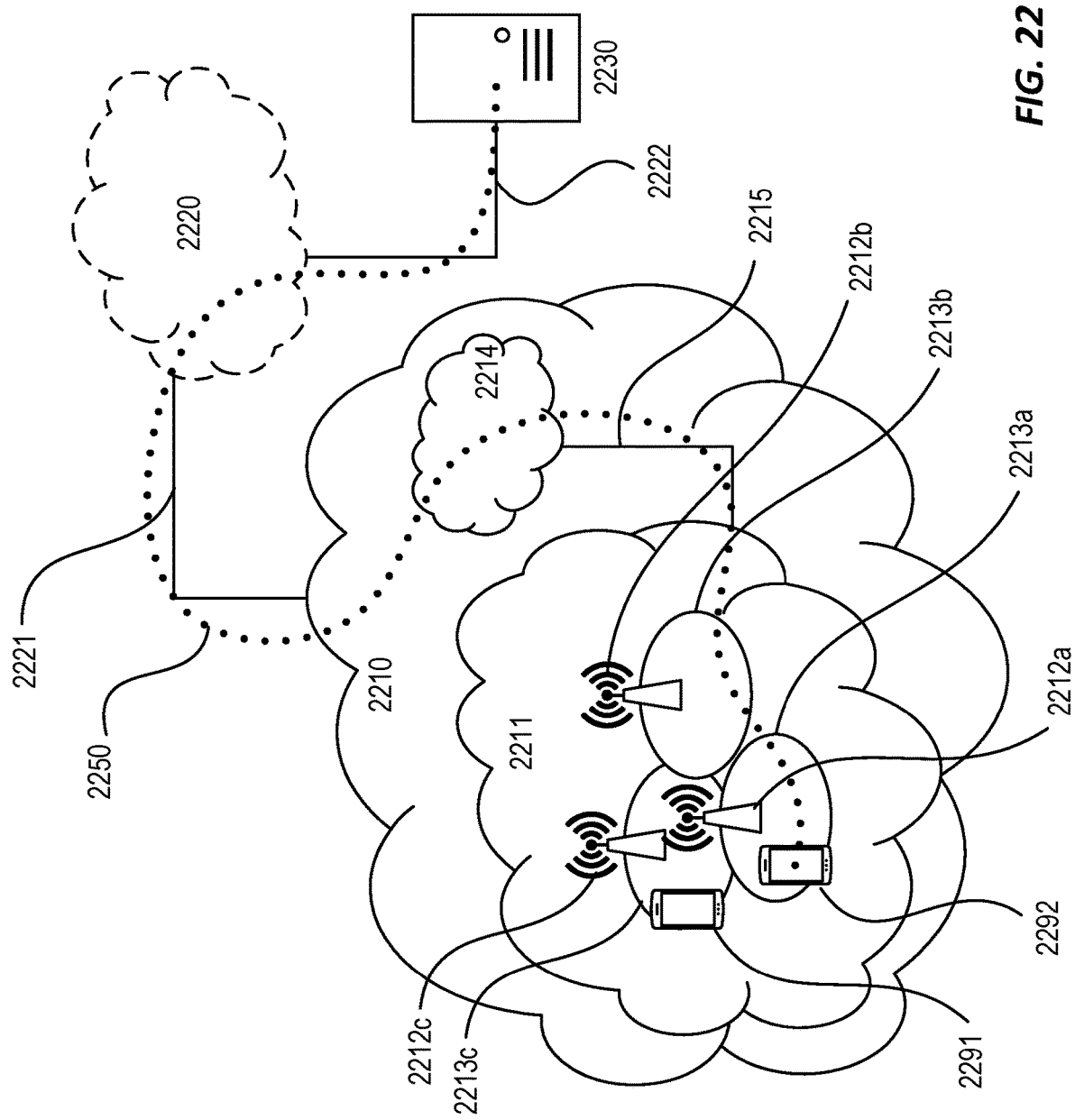
FIGS. 22-23 are block diagrams of various communication systems and/or networks, according to various embodiments of the present disclosure.

With reference to FIG. 22, in accordance with an embodiment, a communication system includes telecommunication network 2210, such as a 3GPP-type cellular network, which comprises access network 2211, such as a radio access network, and core network 2214. Access network 2211 comprises a plurality of base stations 2212*a*, 2212*b*, 2212*c*, such as NBs, eNBs, gNBs or other types of wireless access points, each defining a corresponding coverage area 2213a, 2213b, 2213c. Each base station 2212a, 2212b, 2212c is connectable to core network 2214 over a wired or wireless connection 2215. A first UE 2291 located in coverage area 2213c can be configured to wirelessly connect to, or be paged by, the corresponding base station 2212c. A second UE 2292 in coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the base stations in the coverage area.

Telecommunication network 2210 is itself connected to host computer 2230, which can be embodied in the hardware and/or software of a standalone server, a cloud-implemented server, a distributed server or as processing resources in a server farm. Host computer 2230 can be under the ownership or control of a service provider or can be operated by the service provider or on behalf of the service provider. Connections 2221 and 2222 between telecommunication network 2210 and host computer 2230 can extend directly from core network 2214 to host computer 2230 or can go via an optional intermediate network 2220. Intermediate network 2220 can be one of, or a combination of more than one of, a public, private or hosted network; intermediate network 2220, if any, can be a backbone network or the Internet; in particular, intermediate network 2220 can comprise two or more sub-networks (not shown).

The communication system of FIG. 22 as a whole enables connectivity between the connected UEs 2291, 2292 and host computer 2230. The connectivity can be described as an over-the-top (OTT) connection 2250. Host computer 2230 and the connected UEs 2291, 2292 are configured to communicate data and/or signaling via OTT connection 2250, using access network 2211, core network 2214, any intermediate network 2220 and possible further infrastructure (not shown) as intermediaries. OTT connection 2250 can be transparent in the sense that the participating communication devices through which OTT connection 2250 passes are unaware of routing of uplink and downlink communications. For example, base station 2212 may not or need not be informed about the past routing of an incoming downlink communication with data originating from host computer 2230 to be forwarded (e.g., handed over) to a connected UE 2291. Similarly, base station 2212 need not be aware of the future routing of an outgoing uplink communication originating from the UE 2291 towards the host computer 2230.

Example implementations, in accordance with an embodiment, of the UE, base station and host computer discussed in the preceding paragraphs will now be described with reference to FIG. 23. In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which can have storage and/or processing capabilities. In particular, processing circuitry 2318 can comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 can be operable to provide a service to a remote user, such as UE 2330 connecting via OTT connection 2350 terminating at UE 2330 and host computer 2310. In providing the service to the remote user, host application 2312 can provide user data which is transmitted using OTT connection 2350.

Communication system 2300 can also include base station 2320 provided in a telecommunication system and comprising hardware 2325 enabling it to communicate with host computer 2310 and with UE 2330. Hardware 2325 can include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 can be configured to facilitate connection 2360 to host computer 2310. Connection 2360 can be direct, or it can pass through a core network (not shown in FIG. 23) of the telecommunication system and/or through one or more intermediate networks outside the telecommunication system. In the embodiment shown, hardware 2325 of base station 2320 can also include processing circuitry 2328, which can comprise one or more programmable processors, application-specific integrated circuits, field programmable gate arrays or combinations of these (not shown) adapted to execute instructions.

Base station 2320 also includes software 2321 stored internally or accessible via an external connection. For example, software 2321 can include program instructions (also referred to as a computer program product) that, when executed by processing circuitry 2328, can configure base station 2320 to perform operations corresponding to various exemplary methods (e.g., procedures) described herein.

Communication system 2300 can also include UE 2330 already referred to, whose hardware 2335 can include radio interface 2337 configured to set up and maintain wireless connection 2370 with a base station serving a coverage area in which UE 2330 is currently located. Hardware 2335 of UE 2330 can also include processing circuitry 2338, which can comprise one or more programmable processors, application-specific integrated circuits, field programmable gate arrays or combinations of these (not shown) adapted to execute instructions.

UE 2330 also includes software 2331, which is stored in or accessible by UE 2330 and executable by processing circuitry 2338. Software 2331 includes client application 2332. Client application 2332 can be operable to provide a service to a human or non-human user via UE 2330, with the support of host computer 2310. In host computer 2310, an executing host application 2312 can communicate with the executing client application 2332 via OTT connection 2350 terminating at UE 2330 and host computer 2310. In providing the service to the user, client application 2332 can receive request data from host application 2312 and provide user data in response to the request data. OTT connection 2350 can transfer both the request data and the user data. Client application 2332 can interact with the user to generate the user data that it provides. Software 2331 can also include program instructions (also referred to as a computer program product) that, when executed by processing circuitry 2338, can configure UE 2330 to perform operations corresponding to various exemplary methods (e.g., procedures) described herein.

Figure 23:
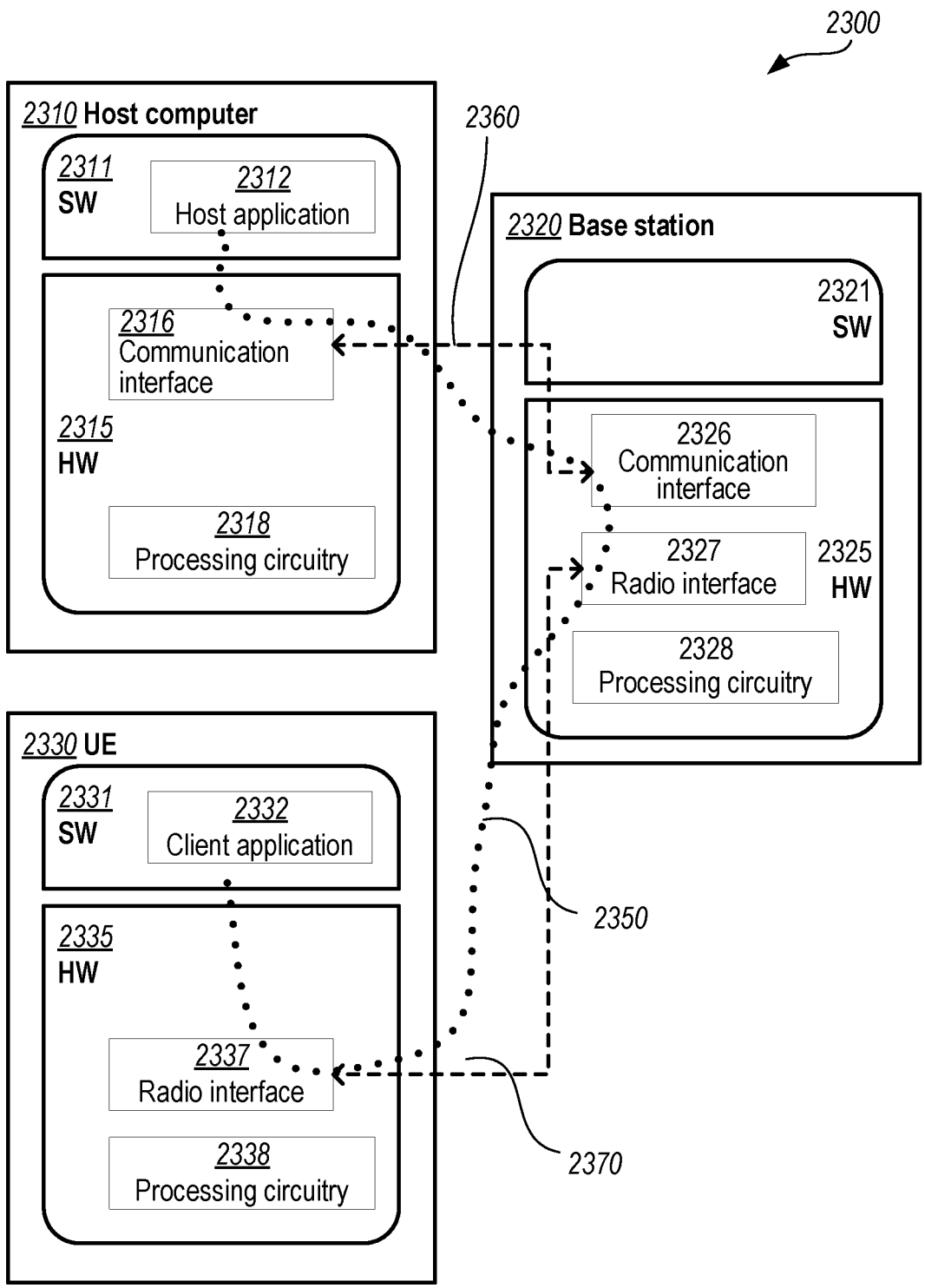

As an example, host computer 2310, base station 2320 and UE 2330 illustrated in FIG. 23 can be similar or identical to host computer 2530, one of base stations 2512a, 2512b, 2512c and one of UEs 2591, 2592 of FIG. 25, respectively. This is to say, the inner workings of these entities can be as shown in FIG. 23 and independently, the surrounding network topology can be that of FIG. 25.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure can determine the routing, which it can be configured to hide from UE 2330 or from the service provider operating host computer 2310, or both. While OTT connection 2350 is active, the network infrastructure can further take decisions by which it dynamically to changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2350 between host computer 2310 and UE 2330, in response to variations in the measurement results. The measurement procedure and/or the network functionality for reconfiguring OTT connection 2350 can be implemented in software 2311 and hardware 2315 of host computer 2310 or in software 2331 and hardware 2335 of UE 2330, or both. In embodiments, sensors (not shown) can be deployed in or in association with communication devices through which OTT connection 2350 passes; the sensors can participate in the measurement procedure by supplying values of the monitored quantities exemplified above, or supplying values of other physical quantities from which software 2311, 2328 can compute or estimate the monitored quantities. The reconfiguring of OTT connection 2350 can include message format, retransmission settings, preferred routing etc.; the reconfiguring need not affect base station 2320, and it can be unknown or imperceptible to base station 2320. Such procedures and functionalities can be known and practiced in the art. In certain embodiments, measurements can involve proprietary UE signaling facilitating host computer 2310's measurements of throughput, propagation times, latency and the like. The measurements can be implemented in that software 2311 and 2328 causes messages to be transmitted, in particular empty or 'dummy' messages, using OTT connection 2350 while it monitors propagation times, errors, etc.

FIG. 24 is a flowchart illustrating an exemplary method (e.g., procedure) implemented in a communication system, in accordance with various embodiments. The communication system includes a host computer, a base station and a UE which, in some exemplary embodiments, can be those described with reference to other figures herein. For simplicity of the present disclosure, only drawing references to FIG. 24 will be included in this section. In step 2410, the host computer provides user data. In substep 2411 (which can be optional) of step 2410, the host computer provides the user data by executing a host application. In step 2420, the host computer initiates a transmission carrying the user data to the UE. In step 2430 (which can be optional), the base station transmits to the UE the user data which was carried in the transmission that the host computer initiated, in accordance with the teachings of the embodiments described throughout this disclosure. In step 2440 (which can also be optional), the UE executes a client application associated with the host application executed by the host computer.

FIG. 25 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission can pass via the base station, in accordance with the teachings of the embodiments described throughout this disclosure. In step 2530 (which can be optional), the UE receives the user data carried in the transmission.

FIG. 26 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 26 will be included in this section. In step 2610 (which can be optional), the UE receives input data provided by the host computer. Additionally or alternatively, in step 2620, the UE provides user data. In substep 2621 (which can be optional) of step 2620, the UE provides the user data by executing a client application. In substep 2611 (which can be optional) of step 2610, the UE executes a client application which provides the user data in reaction to the received input data provided by the host computer. In providing the user data, the executed client application can further consider user input received from the user. Regardless of the specific manner in which the user data was provided, the UE initiates, in substep 2630 (which can be optional), transmission of the user data to the host computer. In step 2640 of the method, the host computer receives the user data transmitted from the UE, in accordance with the teachings of the embodiments described throughout this disclosure.

FIG. 27 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 27 will be included in this section. In step 2710 (which can be optional), in accordance with the teachings of the embodiments described throughout this disclosure, the base station receives user data from the UE. In step 2720 (which can be optional), the base station initiates transmission of the received user data to the host computer. In step 2730 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method, for a user equipment (UE), to report radio link failure (RLF) in a wireless network, the method comprising:
  sending, to a radio network node (RNN) in the wireless network, a first message including:
    a first RLF report related to a cell of the wireless network, and
    a second indication of availability of one or more further RLF reports stored by the UE;
  receiving, from the RNN, a second request for at least a portion of the stored RLF reports indicated by the second indication; and
  sending, to the RNN, a second response including a second RLF report of the stored RLF reports.

A2. The method of embodiment A1, wherein the second response includes a third indication of availability of a third RLF report of the stored RLF reports.

A3. The method of any of embodiments A1-A2, wherein the second indication of availability is included in the first RLF report.

A4. The method of any of embodiments A1-A3, wherein:
  the first message is a UEInformationResponse message;
  the second request is received in a UEInformationRequest message; and
  the second response including the second RLF report is a UEInformationResponse message.

A5. The method of any of embodiments A1-A4, wherein the stored RLF reports are associated with a plurality of different radio access technologies (RATs).

A6. The method of embodiment A5, further comprising:
  upon establishing a connection with a cell served by the RNN, sending, to the RNN, a first indication of availability of a plurality of stored RLF reports; and
  receiving, from the RNN, a first request for at least a portion of the stored RLF reports indicated by the first indication,
  wherein the first message is sent in response to the first request.

A7. The method of embodiment A6, wherein:

the first indication indicates that the stored RLF reports are associated with the plurality of different RATs; and the first request is for stored RLF reports associated with at least one of the RATs.

A8. The method of embodiment A7, wherein:
the first request is for stored RLF reports associated with first and second RATs;
the first RLF report is associated with the first RAT; and
the first message includes a further first RLF report associated with the second RAT.

A9. The method of embodiment A6, wherein the first indication indicates availability of only the stored RLF reports that are associated with the RAT used for the connection with the cell.

A10. The method of any of embodiments A5-A9, wherein the first indication is sent in one of the following messages: RRCReconfigurationComplete, RRCResumeComplete, RRCSetupComplete, or RRCReestablishmentComplete.

B1. A method, for a radio network node (RNN) in a wireless network, to receive radio link failure (RLF) reports from user equipment (UEs), the method comprising:
receiving, from a UE, a first message including:
a first RLF report related to a cell of the wireless network, and
a second indication of availability of one or more further RLF reports stored by the UE;
sending, to the UE, a second request for at least a portion of the stored RLF reports indicated by the second indication; and
receiving, from the UE, a second response including a second RLF report of the stored RLF reports.

B2. The method of embodiment B1, wherein the second response includes a third indication of availability of a third RLF report of the stored RLF reports.

B3. The method of any of embodiments B1-B2, wherein the second indication of availability is included in the first RLF report.

B4. The method of any of embodiments B1-B3, wherein:
the first message is a UEInformationResponse message;
the second request is sent in a UEInformationRequest message; and
the second response including the second RLF report is a UEInformationResponse message.

B5. The method of any of embodiments B1-B4, wherein the stored RLF reports are associated with a plurality of different radio access technologies (RATs).

B6. The method of any of embodiments B1-B5, wherein:
the first and second RLF reports are associated with respective first and second radio access technologies (RATs);
the method further comprises:
sending the first RLF report to a first RNN, in the wireless network, that is associated with the first RAT; and
sending the second RLF report to a second RNN, in the wireless network, that is associated with the second RAT.

B7. The method of embodiment B6, wherein:
the first RLF report is sent in a first inter-node message via a first inter-node interface; and
the second RLF report is sent in a second inter-node message via a second inter-node interface.

B8. The method of embodiment B5, further comprising:
upon establishing a connection with the UE, receiving, from the UE, a first indication of availability of a plurality of stored RLF reports; and
sending, to the UE, a first request for at least a portion of the stored RLF reports indicated by the first indication,
wherein the first message is received in response to the first request.

B9. The method of embodiment B8, wherein:
the first indication indicates that the stored RLF reports are associated with the plurality of different RATs; and
the first request is for stored RLF reports associated with at least one of the RATs.

B10. The method of embodiment B9, wherein:
the first request is for stored RLF reports associated with first and second RATs;
the first RLF report is associated with the first RAT; and
the first message includes a further first RLF report associated with the second RAT.

B11. The method of embodiment B8, wherein the first indication indicates availability of only the stored RLF reports that are related to the RAT used for the connection with the UE.

B12. The method of any of embodiments B8-B11, wherein the first indication is received in one of the following messages: RRCReconfigurationComplete, RRCResumeComplete, RRCSetupComplete, or RRCReestablishmentComplete.

C1. A user equipment (UE) configured to report radio link failure (RLF) in a wireless network, the UE comprising:
radio transceiver circuitry configured to communicate with a radio network node (RNN) in the wireless network; and
processing circuitry operatively coupled to the radio transceiver circuitry, whereby the processing circuitry and the radio transceiver circuitry are configured to perform operations corresponding to the methods of any of embodiments A1-A10.

C2. A user equipment (UE) configured to report radio link failure (RLF) in a wireless network, the UE being further arranged to perform operations corresponding to the methods of any of embodiments A1-A10.

C3. A non-transitory, computer-readable medium storing computer-executable instructions that, when executed by processing circuitry of a user equipment (UE) configured to report radio link failure (RLF) in a wireless network, configure the UE to perform operations corresponding to the methods of any of embodiments A1-A10.

C4. A computer program product comprising computer-executable instructions that, when executed by processing circuitry of a user equipment (UE) configured to report radio link failure (RLF) in a wireless network, configure the UE to perform operations corresponding to the methods of any of embodiments A1-A10.

D1. A radio network node (RNN) arranged to receive radio link failure (RLF) reports from user equipment (UEs) in a wireless network, the RNN comprising:
communication interface circuitry configured to communicate with one or more UEs and with one or more further RNNs in the wireless network; and
processing circuitry operatively coupled to the communication interface circuitry, whereby the processing circuitry and the communication interface circuitry are configured to perform operations corresponding to the methods of any of embodiments B1-B12.

D2. A radio network node (RNN) arranged to receive radio link failure (RLF) reports from user equipment (UEs) in a wireless network, the RNN being further arranged to perform operations corresponding to the methods of any of embodiments B1-B12.

D3. A non-transitory, computer-readable medium storing computer-executable instructions that, when executed by processing circuitry of a radio network node (RNN) arranged to receive radio link failure (RLF) reports from user equipment (UEs) in a wireless network, configure the RNN to perform operations corresponding to the methods of any of embodiments B1-B12.

D4. A computer program product comprising computer-executable instructions that, when executed by processing circuitry of a radio network node (RNN) receive radio link failure (RLF) reports from user equipment (UEs) in a wireless network, configure the RNN to perform operations corresponding to the methods of any of embodiments B1-B12.

The invention claimed is:

1. A method for a user equipment (UE) to report radio link failure (RLF) in a wireless network, the method comprising:
upon establishing a connection with a radio network node (RNN) in the wireless network, sending to the RNN a first indication of availability of a plurality of stored RLF reports;
receiving, from the RNN, a first request for at least a portion of the plurality of RLF reports indicated by the first indication;
sending, to the RNN in response to the first request, a first message including:
a first RLF report related to an RLF that occurred in a cell of the wireless network, and
a second indication of availability of one or more further RLF reports stored by the UE and not yet reported to the wireless network;
receiving, from the RNN, a second request for at least a portion of the one or more further RLF reports indicated by the second indication; and
sending, to the RNN, a second response including a second RLF report of the one or more further RLF reports.

2. The method of claim 1, wherein one or more of the following applies:
the second response includes a third indication of availability of a third RLF report of the one or more further RLF reports; and
the second indication also indicates respective radio access technology (RATs) associated with the one or more further RLF reports stored by the UE.

3. The method of claim 1, wherein the second indication comprises:
a first type of indication when indicating availability of a single further RLF report stored by the UE; and
a second type of indication when indicating availability of a plurality of further RLF reports stored by the UE.

4. The method of claim 1, wherein one or more of the following applies: the second indication is included in the first RLF report, and the first and second RLF reports are associated with different radio access technologies (RATs).

5. The method of claim 1, wherein:
the first indication indicates that the plurality of stored RLF reports are associated with a plurality of different radio access technologies (RATs); and
the first request indicates a particular one or more of the different RATs for which stored RLF reports are requested.

6. The method of claim 5, wherein:
the first request indicates first and second RATs for which stored RLF reports are requested;
the first RLF report is associated with the first RAT; and
the first message includes a further RLF report associated with the second RAT.

7. The method of claim 1, wherein:
the first indication indicates availability of only the stored RLF reports that are associated with one radio access technology (RAT) used for the connection with the RNN;
the first message includes a plurality of RLF reports associated with the one RAT used for the connection with the RNN; and
the one or more further RLF reports, indicated by the second indication, are associated with RATs other than the one RAT used for the connection with the RNN.

8. The method of claim 1, wherein the one or more further RLF reports, indicated by the second indication, are related to respective one or more RLFs that occurred after an RLF related to the first RLF report.

9. A user equipment (UE) configured to report radio link failure (RLF) in a wireless network, the UE comprising:
communication interface circuitry configured to communicate with a radio network node (RNN) in the wireless network; and
processing circuitry operatively coupled to the communication interface circuitry, whereby the processing circuitry and the communication interface circuitry are configured to perform operations corresponding to the method of claim 1.

10. A method for a radio network node (RNN) to receive radio link failure (RLF) reports from user equipment (UEs) in a wireless network, the method comprising:
upon establishing a connection with a UE, receiving from the UE a first indication of availability of a plurality of stored RLF reports;
sending, to the UE, a first request for at least a portion of the plurality of RLF reports indicated by the first indication;
receiving, from a UE in response to the first request, a first message including:
a first RLF report related to an RLF that occurred in a cell of the wireless network, and
a second indication of availability of one or more further RLF reports stored by the UE and not yet reported to the wireless network;
sending, to the UE, a second request for at least a portion of the one or more further RLF reports indicated by the second indication; and
receiving, from the UE, a second response including a second RLF report of the one or more further RLF reports.

11. The method of claim 10, wherein one or more of the following applies:
the second response includes a third indication of availability of a third RLF report of the one or more further RLF reports; and
the second indication also indicates respective radio access technology (RATs) associated with the one or more further RLF reports stored by the UE.

12. The method of claim 10, wherein the second indication comprises:

a first type of indication when indicating availability of a single further RLF report stored by the UE; and a second type of indication when indicating availability of a plurality of further RLF reports stored by the UE.

13. The method of claim 10, wherein one or more of the following applies: the second indication is included in the first RLF report, and the first and second RLF reports are associated with different radio access technologies (RATs).

14. The method of claim 13, further comprising:
sending the first RLF report to a first RNN, in the wireless network, that is associated with the same RAT as the first RLF report; and
sending the second RLF report to a second RNN, in the wireless network, that is associated with the same RAT as the second RLF report.

15. The method of claim 10, wherein:
the first indication indicates that the plurality of stored RLF reports are associated with a plurality of different radio access technologies (RATs); and
the first request indicates a particular one or more of the different RATs for which stored RLF reports are requested.

16. The method of claim 15, wherein:
the first request indicates first and second RATs for which stored RLF reports are requested;
the first RLF report is associated with the first RAT; and
the first message includes a further RLF report associated with the second RAT.

17. The method of claim 10, wherein:
the first indication indicates availability of only the stored RLF reports that are associated with one radio access technology (RAT) used for the connection with the RNN;
the first message includes a plurality of RLF reports associated with the one RAT used for the connection with the RNN; and
the one or more further RLF reports, indicated by the second indication, are associated with RATs other than the one RAT used for the connection with the RNN.

18. The method of claim 10, wherein the one or more further RLF reports, indicated by the second indication, are related to respective one or more RLFs that occurred after an RLF related to the first RLF report.

19. A radio network node (RNN) configured to receive radio link failure (RLF) reports from user equipment (UEs) in a wireless network, the RNN comprising:
communication interface circuitry configured to communicate with one or more UEs and with one or more further RNNs in the wireless network; and
processing circuitry operatively coupled to the communication interface circuitry, whereby the processing circuitry and the communication interface circuitry are configured to perform operations corresponding to the method of claim 10.

* * * * *